(12) United States Patent
Jang et al.

(10) Patent No.: US 9,046,892 B2
(45) Date of Patent: *Jun. 2, 2015

(54) SUPERVISION AND CONTROL OF HETEROGENEOUS AUTONOMOUS OPERATIONS

(75) Inventors: Jung Soon Jang, Bellevue, WA (US);
John Lyle Vian, Renton, WA (US);
Gregory John Clark, Seattle, WA (US);
Emad W. Saad, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/560,569

(22) Filed: Sep. 16, 2009

(65) Prior Publication Data

US 2010/0312388 A1    Dec. 9, 2010

Related U.S. Application Data

(63) Continuation-in-part of application No. 12/479,667, filed on Jun. 5, 2009.

(51) Int. Cl.
*G05D 1/00* (2006.01)
*G06Q 10/06* (2012.01)

(52) U.S. Cl.
CPC .... *G05D 1/0088* (2013.01); *G05B 2219/39377* (2013.01); *G06Q 10/0631* (2013.01)

(58) Field of Classification Search
CPC ............... G05D 2201/0207; G05D 1/0295; G05D 1/0027; G05D 1/0291; B64G 1/1085; F41H 7/005; B25J 9/0003; B25J 9/162
See application file for complete search history.

(56) References Cited

U.S. PATENT DOCUMENTS

| | | |
|---|---|---|
| 2,849,701 A | 8/1958 | Clark |
| 4,463,428 A | 7/1984 | Gilliam |
| 4,827,416 A | 5/1989 | Kawagoe et al. |
| 4,918,321 A | 4/1990 | Klenk et al. |
| 5,014,042 A | 5/1991 | Michoud et al. |
| 5,036,935 A | 8/1991 | Kohara |
| 5,203,646 A | 4/1993 | Landsberger et al. |
| 5,220,263 A | 6/1993 | Onishi et al. |
| 5,237,404 A | 8/1993 | Tanaka et al. |
| 5,318,254 A | 6/1994 | Shaw et al. |
| 5,324,948 A | 6/1994 | Dudar et al. |

(Continued)

FOREIGN PATENT DOCUMENTS

| | | |
|---|---|---|
| EP | 0512866 A1 | 11/1992 |
| EP | 1193168 A2 | 4/2002 |

(Continued)

OTHER PUBLICATIONS

GB Combined Search and Examination Report for application P49034GB/AER dated Jun. 10, 2010.

(Continued)

*Primary Examiner* — Bao Long T Nguyen
(74) *Attorney, Agent, or Firm* — Yee & Associates, P.C.

(57) ABSTRACT

The different advantageous embodiments may provide an apparatus that may include a number of robotic machine groups, a mission planner, and a mission control. The mission planner may be capable of generating a mission for the number of robotic machine groups. The mission control may be capable of executing the mission using the number of robotic machine groups.

19 Claims, 12 Drawing Sheets

(56) References Cited

U.S. PATENT DOCUMENTS

| | | | |
|---|---|---|---|
| 5,334,982 A | 8/1994 | Owen | |
| 5,340,056 A | 8/1994 | Guelman et al. | |
| 5,351,621 A | 10/1994 | Tanaka et al. | |
| 5,416,476 A | 5/1995 | Rendon | |
| 5,487,440 A | 1/1996 | Seemann | |
| 5,490,646 A | 2/1996 | Shaw et al. | |
| 5,586,028 A | 12/1996 | Sekine et al. | |
| 5,633,707 A | 5/1997 | Seemann | |
| 5,695,155 A | 12/1997 | Macdonald et al. | |
| 5,726,705 A | 3/1998 | Imanishi et al. | |
| 5,831,570 A | 11/1998 | Ammar et al. | |
| 5,832,187 A | 11/1998 | Pedersen et al. | |
| 5,845,002 A | 12/1998 | Heck et al. | |
| 5,845,725 A | 12/1998 | Kawada | |
| 5,982,278 A | 11/1999 | Cuvelier | |
| 5,995,884 A | 11/1999 | Allen et al. | |
| 6,236,735 B1 | 5/2001 | Bjorner et al. | |
| 6,266,138 B1 | 7/2001 | Keshavmurthy | |
| 6,293,141 B1 | 9/2001 | Nance | |
| 6,364,026 B1 | 4/2002 | Doshay | |
| 6,476,712 B1 | 11/2002 | Achterholt | |
| 6,565,361 B2 | 5/2003 | Jones et al. | |
| 6,606,563 B2 | 8/2003 | Corcoran, III | |
| 6,671,588 B2 | 12/2003 | Otake et al. | |
| 6,819,265 B2 | 11/2004 | Jamieson et al. | |
| 6,825,758 B1 | 11/2004 | Laitsaari | |
| 6,842,674 B2 * | 1/2005 | Solomon | 701/23 |
| 6,888,446 B2 | 5/2005 | Nantz et al. | |
| 6,898,484 B2 * | 5/2005 | Lemelson et al. | 700/245 |
| 6,904,335 B2 | 6/2005 | Solomon | |
| 6,907,799 B2 | 6/2005 | Jacobsen et al. | |
| 6,947,797 B2 | 9/2005 | Dean et al. | |
| 6,953,094 B2 | 10/2005 | Ross et al. | |
| 6,970,576 B1 | 11/2005 | Tilsey | |
| 6,984,952 B2 | 1/2006 | Peless et al. | |
| 7,076,335 B2 | 7/2006 | Seemann | |
| 7,212,106 B2 | 5/2007 | Katou | |
| 7,218,993 B2 | 5/2007 | Yasukawa et al. | |
| 7,236,861 B2 | 6/2007 | Paradis et al. | |
| 7,250,849 B2 | 7/2007 | Spriggs | |
| 7,280,890 B2 | 10/2007 | Seemann | |
| 7,303,010 B2 * | 12/2007 | de Guzman et al. | 166/255.1 |
| 7,327,112 B1 | 2/2008 | Hlynka et al. | |
| 7,337,156 B2 | 2/2008 | Wippich | |
| 7,343,222 B2 * | 3/2008 | Solomon | 700/245 |
| 7,414,523 B2 | 8/2008 | Li et al. | |
| 7,417,738 B2 | 8/2008 | Taylor et al. | |
| 7,499,772 B2 | 3/2009 | Wilcox et al. | |
| 7,501,616 B2 | 3/2009 | Wiklof | |
| 7,586,422 B2 | 9/2009 | Goodman et al. | |
| 7,626,513 B2 | 12/2009 | Goodman et al. | |
| 7,627,447 B2 | 12/2009 | Marsh et al. | |
| 7,714,702 B2 | 5/2010 | Khuzadi | |
| 7,765,038 B2 * | 7/2010 | Appleby et al. | 701/23 |
| 7,765,668 B2 | 8/2010 | Townsend et al. | |
| 7,796,018 B2 | 9/2010 | Khuzadi | |
| 7,797,095 B2 | 9/2010 | Rado | |
| 7,813,888 B2 | 10/2010 | Vian et al. | |
| 7,817,026 B2 | 10/2010 | Watabe et al. | |
| 7,832,281 B2 | 11/2010 | Mian et al. | |
| 7,844,364 B2 | 11/2010 | McLurkin et al. | |
| 7,860,618 B2 | 12/2010 | Brandstetter et al. | |
| 7,894,948 B2 | 2/2011 | Stroud | |
| 7,896,113 B1 | 3/2011 | Ramirez | |
| 7,941,261 B2 | 5/2011 | Johnsen | |
| 8,051,547 B2 | 11/2011 | Toh et al. | |
| 8,060,270 B2 | 11/2011 | Vian et al. | |
| 8,078,319 B2 * | 12/2011 | Franke et al. | 700/248 |
| 8,140,250 B2 | 3/2012 | Mian et al. | |
| 8,145,367 B2 | 3/2012 | Khatwa et al. | |
| 8,150,105 B2 | 4/2012 | Mian et al. | |
| 8,181,532 B2 | 5/2012 | Schmidt et al. | |
| 8,260,485 B1 | 9/2012 | Meuth et al. | |
| 8,504,505 B2 * | 8/2013 | Mintah | 706/46 |
| 8,874,305 B2 | 10/2014 | Dolgov et al. | |
| 2002/0073788 A1 | 6/2002 | Hatley et al. | |
| 2003/0048081 A1 | 3/2003 | Seemann | |
| 2003/0089183 A1 | 5/2003 | Jacobsen et al. | |
| 2003/0135327 A1 | 7/2003 | Levine et al. | |
| 2004/0030571 A1 * | 2/2004 | Solomon | 705/1 |
| 2004/0054507 A1 | 3/2004 | Mott | |
| 2004/0055746 A1 | 3/2004 | Ross et al. | |
| 2004/0073324 A1 | 4/2004 | Pierro et al. | |
| 2004/0073411 A1 | 4/2004 | Alston et al. | |
| 2004/0158358 A1 | 8/2004 | Anezaki et al. | |
| 2004/0162638 A1 * | 8/2004 | Solomon | 700/247 |
| 2005/0033517 A1 | 2/2005 | Kondoh et al. | |
| 2005/0073585 A1 | 4/2005 | Ettinger et al. | |
| 2005/0113943 A1 * | 5/2005 | Nian | 700/83 |
| 2005/0126794 A1 | 6/2005 | Palmer et al. | |
| 2005/0217589 A1 | 10/2005 | Daniel et al. | |
| 2005/0251291 A1 * | 11/2005 | Solomon | 700/245 |
| 2006/0085106 A1 | 4/2006 | Gaudiano et al. | |
| 2006/0114531 A1 | 6/2006 | Webb et al. | |
| 2006/0184291 A1 | 8/2006 | Paradis et al. | |
| 2006/0198952 A1 | 9/2006 | Nagase et al. | |
| 2006/0271251 A1 | 11/2006 | Hopkins | |
| 2007/0062299 A1 | 3/2007 | Mian et al. | |
| 2007/0081154 A1 | 4/2007 | Mapoles et al. | |
| 2007/0129847 A1 | 6/2007 | Ulmer et al. | |
| 2007/0146728 A1 | 6/2007 | Pristner et al. | |
| 2007/0208442 A1 | 9/2007 | Perrone | |
| 2007/0272841 A1 | 11/2007 | Wiklof et al. | |
| 2008/0004749 A1 | 1/2008 | Hostettler | |
| 2008/0021604 A1 | 1/2008 | Bouvier et al. | |
| 2008/0140318 A1 | 6/2008 | Breed | |
| 2008/0148876 A1 | 6/2008 | Hock et al. | |
| 2008/0252489 A1 | 10/2008 | Naimer et al. | |
| 2008/0270866 A1 | 10/2008 | Choi | |
| 2008/0297333 A1 | 12/2008 | Khuzadi | |
| 2008/0297375 A1 | 12/2008 | Khuzadi | |
| 2009/0079839 A1 | 3/2009 | Fischer et al. | |
| 2009/0219393 A1 | 9/2009 | Vian et al. | |
| 2009/0243828 A1 | 10/2009 | Hering et al. | |
| 2009/0285491 A1 | 11/2009 | Ravenscroft et al. | |
| 2010/0017052 A1 | 1/2010 | Luce | |
| 2010/0023201 A1 | 1/2010 | Kinney et al. | |
| 2010/0039294 A1 | 2/2010 | Feyereisen et al. | |
| 2010/0063650 A1 | 3/2010 | Vian et al. | |
| 2010/0094487 A1 | 4/2010 | Brinkman | |
| 2010/0211358 A1 | 8/2010 | Kesler et al. | |
| 2010/0235037 A1 | 9/2010 | Vian et al. | |
| 2010/0250022 A1 | 9/2010 | Hines et al. | |
| 2010/0271191 A1 | 10/2010 | de Graff et al. | |
| 2010/0312387 A1 | 12/2010 | Jang et al. | |
| 2011/0313614 A1 | 12/2011 | Hinnant, Jr. et al. | |
| 2012/0038492 A1 | 2/2012 | Maggiore et al. | |
| 2012/0041639 A1 | 2/2012 | Followell et al. | |
| 2012/0081540 A1 | 4/2012 | Jang | |
| 2012/0130701 A1 | 5/2012 | Khella | |
| 2013/0261876 A1 | 10/2013 | Froom et al. | |
| 2014/0222325 A1 | 8/2014 | Followell et al. | |

FOREIGN PATENT DOCUMENTS

| | | |
|---|---|---|
| EP | 1619625 | 1/2006 |
| EP | 1884453 A2 | 2/2008 |
| EP | 2208971 | 7/2010 |
| EP | 2259245 | 12/2010 |
| FR | 2930669 A1 | 10/2009 |
| GB | 2308656 | 7/1997 |
| GB | 2429819 | 3/2007 |
| JP | 2007183172 | 7/2007 |
| WO | WO2004081488 | 9/2004 |
| WO | WO2005113261 | 12/2005 |
| WO | WO2006053433 | 5/2006 |
| WO | WO2007080584 | 7/2007 |
| WO | 2008127468 A2 | 10/2008 |
| WO | 2009142933 A2 | 11/2009 |
| WO | WO2010141180 | 12/2010 |
| WO | WO2011119634 | 9/2011 |

(56) References Cited

FOREIGN PATENT DOCUMENTS

| WO | WO2012021177 | 2/2012 |
|---|---|---|
| WO | WO2012021179 | 2/2012 |
| WO | WO2012047479 | 4/2012 |

OTHER PUBLICATIONS

International Search Report for Application No. PCT/US2010/033917 dated Nov. 26, 2010.
PCT Search Report regarding Application PCT/US2011/029466, filed Mar. 22, 2011, Issued by International Searching Authority.
U.S. Appl. No. 11/857,217, filed Sep. 18, 2007, Vian et al.
U.S. Appl. No. 12/124,511, filed May 21, 2008, Vian et al.
U.S. Appl. No. 12/205,658, filed Sep. 5, 2008, Vian et al.
U.S. Appl. No. 12/124,565, filed May 21, 2008, Vian et al.
U.S. Appl. No. 12/479,667, filed Jun. 5, 2009, Jang et al.
U.S. Appl. No. 12/701,033, filed Feb. 5, 2010, Kesler et al.
Office Action, dated May 23, 2013, regarding U.S. Appl. No. 12/70,594, 28 pages.
Final Office Action, dated Mar. 7, 2013, regarding U.S. Appl. No. 12/854,646, 22 pages.
Office Action, dated Mar. 28, 2013, regarding U.S. Appl. No. 12/854,671, 37 pages.
"In-Sight Line Scan Vision System", Cognex, Webinar, retrieved Feb. 5, 2010, 17 pages.
Ollero, "Mutliple Heterogenous Unmanned Aerial Vehicles", Springer Tracts in Advanced Robotics, vol. 37, Copyright 2007, 233 pages (Abstract).
"Unmanned Aerial Vehicle (UAV) ZALA 421-04M chosen for Aerial Monitoring of Forest Fires", published by news.wood.ru, Feb. 2010, 3 pages.
Frost, "A Practical Guide to Using the In-Sight 5604 Line Scan Vision System", Cognex, In-Sight Vision Systems, Mar. 2009, 20 pages.
Gunatilake et al., "Image Understanding Algorithms for Remote Visual Inspection of Aircraft Surfaces", Proceedings of the SPIE conference on Machine Vision Applications in Industrial Inspection V, Copyright 1997, 12 pages.
DeVault, "Robotic system for underwater inspection of bridge piers", IEEE Instrumentation & Measurement Magazine, vol. 3, Iss.3, Sep. 2000, pp. 32-37 (Abstract).
GB Search Report and Examination Report dated Jun. 14, 2011 regarding application GB1100763.0, applicant's reference P51280GB/AER/LJW, applicant The Boeing Company, 9 pages.
PCT Search Report and Written Opinion dated Jun. 8, 2011 regarding international application PCT/US2011/029766, applicant's reference 10-0173PCT, applicant The Boeing Company, 9 pages.
PCT Search Report dated Feb. 16, 2012 regarding international application PCT/US2011/030150, applicant's reference 10-0174PCT, applicant the Boeing Company, 6 pages.
PCT Search Report dated Feb. 7, 2012 regarding international application PCT/US2011/051830, applicant's reference 10-0602PCT, applicant the Boeing Company, 4 pages.
USPTO Office Action dated Nov. 4, 2011 regarding U.S. Appl. No. 12/701,033, 24 pages.
USPTO Final Office Action dated Apr. 13, 2012 regarding U.S. Appl. No. 12/701,033, 18 pages.
USPTO Office Action dated Apr. 13, 2012 regarding U.S. Appl. No. 12/404,493, 22 pages.
USPTO Office Action dated Jun. 15, 2012 regarding U.S. Appl. No. 13/086,521, 18 pages.
USPTO Office Action dated Nov. 8, 2010 regarding U.S. Appl. No. 12/124,565, 13 pages.
USPTO Final Office Action dated Mar. 15, 2011 regarding U.S. Appl. No. 12/124,565, 14 pages.
USPTO Notice of Allowance dated Aug. 18, 2011 regarding U.S. Appl. No. 12/124,565, 7 pages.
USPTO Office Action dated May 10, 2011 regarding U.S. Appl. No. 12/372,616, 27 pages.
USPTO Final Office Action dated Oct. 28, 2011 regarding U.S. Appl. No. 12/372,616, 30 pages.
USPTO Office Action dated Feb. 15, 2012 regarding U.S. Appl. No. 12/372,616, 22 pages.
USPTO Final Office Action dated Jul. 12, 2012 regarding U.S. Appl. No. 12/372,616, 23 pages.
USPTO Office Action dated Aug. 13, 2012 regarding U.S. Appl. No. 12/701,033, 28 pages.
USPTO final Office Action dated Oct. 3, 2012 regarding U.S. Appl. No. 12/404,493, 18 pages.
USPTO Office Action dated Feb. 21, 2012 regarding U.S. Appl. No. 12/479,667, 25 pages.
Maggiore et al., "Runway Condition Monitoring", U.S. Appl. No. 12/730,594, filed Mar. 14, 2010, 43 pages.
Vian et al., "Fire Management System", U.S. Appl. No. 13/086,521, filed Apr. 14, 2011, 56 pages.
USPTO non-final office action dated Aug. 16, 2012 regarding U.S. Appl. No. 12/370,594, 25 pages.
USPTO non-final office action dated Aug. 31, 2012 regarding U.S. Appl. No. 12/854,646 19 pages.
Office Action, dated Dec. 21, 2012, regarding U.S. Appl. No. 12/372,616, 39 pages.
Final Office Action, dated Jan. 8, 2013, regarding U.S. Appl. No. 12/701,033, 27 pages.
Final Office Action, dated Dec. 20, 2012, regarding U.S. Appl. No. 12/730,594, 35 pages.
Office Action, dated Dec. 6, 2012, regarding U.S. Appl. No. 12/897,158, 51 pages.
European Patent Office Communication, dated Jul. 23, 2013, regarding Application No. EP11713911.3, 6 pages.
Office Action, dated Sep. 10, 2013, regarding U.S. Appl. No. 12/372,616, 25 pages.
Office Action, dated Sep. 12, 2013, regarding U.S. Appl. No. 12/701,033, 25 pages.
Office Action, dated Jul. 18, 2013, regarding U.S. Appl. No. 12/404,493, 42 pages.
Notice of Allowance, dated Jul. 31, 2013, regarding U.S. Appl. No. 12/854,646, 19 pages.
Final Office Action, dated Jul. 12, 2013, regarding U.S. Appl. No. 12/854,671, 17 pages.
Final Office Action, dated Jun. 26, 2013, regarding U.S. Appl. No. 12/897,158 38 pages.
Final Office Action, dated Oct. 10, 2013, regarding U.S. Appl. No. 12/730,594, 33 pages.
Final Office Action, dated Dec. 13, 2013, regarding U.S. Appl. No. 12/404,493, 24 pages.
Notice of Allowance, dated Dec. 13, 2013, regarding U.S. Appl. No. 12/854,671, 16 pages.
3 Final Office Action, dated Feb. 21, 2014, regarding U.S. Appl. No. 12/701,033, 31 pages.
Final Office Action, dated Feb. 19, 2014, regarding U.S. Appl. No. 13/086,521, 18 pages.
Notice of Allowance, dated Feb. 27, 2014, regarding U.S. Appl. No. 12/730,594, 11 pages.
Final Office Action, dated Apr. 2, 2014, regarding U.S. Appl. No. 12/372,616, 24 pages.
Notice of Allowance, dated Apr. 9, 2014, regarding U.S. Appl. No. 12/404,493, 20 pages.
Office Action, dated Apr. 8, 2014, regarding U.S. Appl. No. 12/897,158, 33 pages.
Final Office Action, dated Sep. 8, 2014, regarding U.S. Appl. No. 12/897,158 36 pages.
Office Action, dated Aug. 8, 2014, regarding U.S. Appl. No. 13/086,521, 20 pages.
Notice of Allowance, dated Oct. 28, 2014, regarding U.S. Appl. No. 12/897,158, 12 pages.
Final Office Action, dated Jan. 14, 2015, regarding U.S. Appl. No. 13/086,521, 23 pages.

* cited by examiner

SUPERVISION AND CONTROL OF HETEROGENEOUS AUTONOMOUS OPERATIONS

CROSS-REFERENCE TO RELATED APPLICATION

The present invention is a continuation-in-part (CIP) of and claims priority to the following patent application: entitled "Supervision and Control of Heterogeneous Autonomous Operations", Ser. No. 12/479,667, filed Jun. 5, 2009, and is incorporated herein by reference.

BACKGROUND INFORMATION

1. Field

The present disclosure relates generally to mission management and, in particular, to an automated system for planning and executing a mission. Still more particularly, the present disclosure relates to a method and apparatus for planning and executing a mission using a mission planning system.

2. Background

Automated systems for scheduling and executing tasks may typically be presented as a single system that populates the same solution for a specific mission or operation. For example, in the aircraft maintenance field, various inspection techniques may be used to inspect objects, such as aircraft structures, following suspected events or to determine whether scheduled or preventative maintenance may be required. Existing aircraft maintenance operations may vary by owner and/or operator, but many may rely on costly customized manual methods of inspection and maintenance. Other existing operation techniques may rely on semi-autonomous or autonomous systems, which may provide limited solutions specific to the type of operation being performed. Implementing various semi-autonomous or autonomous systems specific to a limited type of operation may be cost-prohibitive, time consuming, and inefficient.

Therefore, it would be advantageous to have a method and apparatus that takes into account one or more of the issues discussed above, as well as possibly other issues.

SUMMARY

The different advantageous embodiments may provide an apparatus that may include a number of robotic machine groups, a computer system, and a wireless communications system. The computer system may be capable of generating information for the number of robotic machine groups. The wireless communications system may be capable of providing communications with the number of robotic machine groups and the computer system.

The different advantageous embodiments may further provide a method for mission management. A mission plan may be generated. The mission plan may be sent to a number of robotic machine groups. The progress of the mission plan may be monitored by the number of robotic machine groups. Data may be received from the number of robotic machine groups about the mission plan.

The different advantageous embodiments may further provide a method for mission management. Information about a mission may be received from a number of robotic machines. A conflict in the mission may be identified. A determination may be made as to whether the conflict can be resolved.

The different advantageous embodiments may still further provide an apparatus that may include a number of robotic machine groups, a mission planner, a mission control, a wireless communications system, a logistic planner, and a reflexive planner. The mission planner may be capable of generating a mission for the number of robotic machine groups. The mission control may be capable of executing the mission using the number of robotic machine groups. The wireless communications system may be capable of providing communications with the number of robotic machine groups, the mission control, and the mission planner. The logistic planner may be capable of identifying a number of tasks to execute the mission. The reflexive planner may be capable of modifying the mission in response to a number of messages from the number of robotic machine groups.

The different advantageous embodiments may still further provide a method for mission management. The mission management may be capable of generating a mission plan for a mission. Information may be retrieved from a plurality of databases. The mission plan may be decomposed into a number of tasks. A number of resources may be allocated for the number of tasks in the mission plan. The mission plan may be sent to a number of robotic machine groups. Progress of the mission plan may be monitored by the number of robotic machine groups. Data may be received from the number of robotic machine groups about the mission plan.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
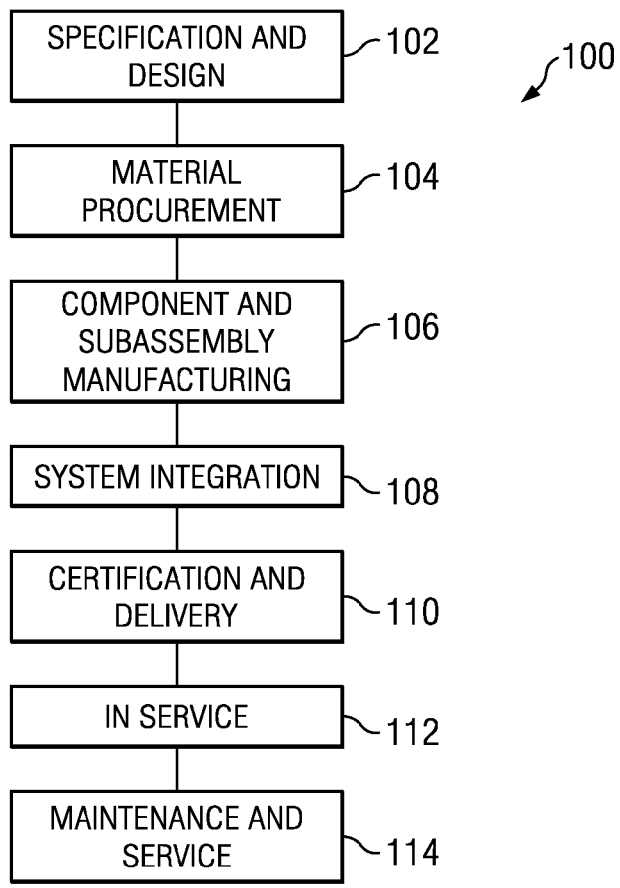
FIG. 1 is an illustration of an aircraft manufacturing and service method in accordance with an advantageous embodiment.
Figure 2:
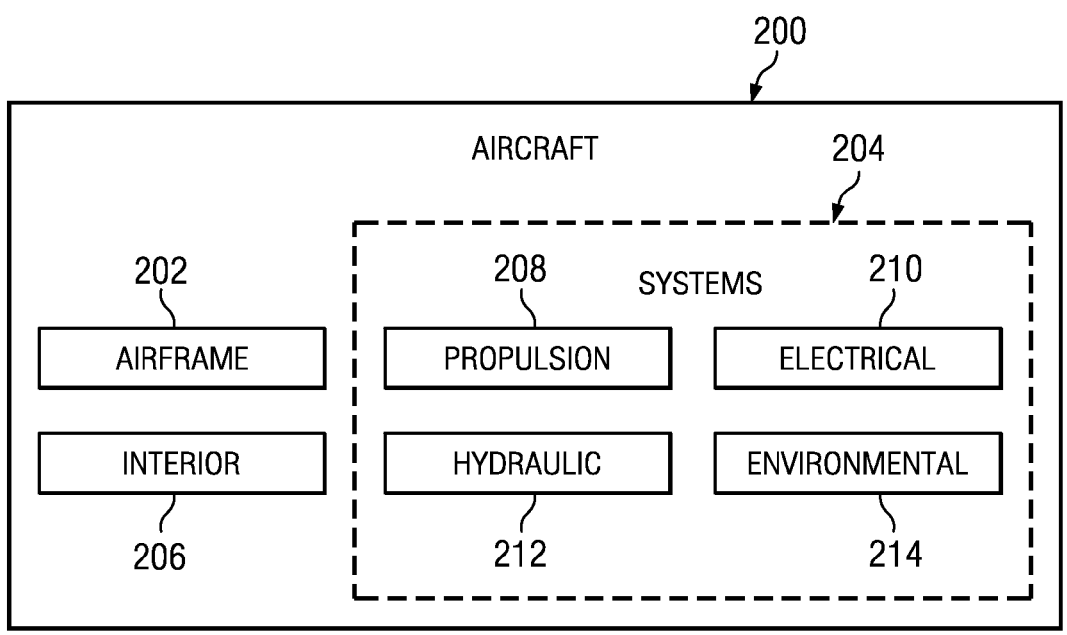
FIG. 2 is illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry. Additionally, different advantageous embodiments may be applied to other infrastructure industries, such as bridges and buildings.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200.

The different advantageous embodiments take into account and recognize that currently used mission planning systems may not provide continuous and/or periodic data needed to detect and monitor intermittent conditions. The different advantageous embodiments also recognize that existing mission planning methods may not autonomously coordinate multiple missions and/or multiple groups of robotic machines executing heterogeneous operations.

The different advantageous embodiments take into account and recognize that currently used planning systems may not be robust enough for dynamically planning and coordinating multiple remote robotic machine groups, each of which may be intermittently dispatched and recalled during a given high level mission. In addition, significant operator workload is required to maintain operations of such complex coupled systems of systems due to functional failure or other unexpected environmental or mission operating conditions.

Thus, one or more of the different advantageous embodiments may provide an apparatus that may include a number of robotic machine groups, a mission planner, and a mission control. The mission planner may be capable of generating a mission for the number of robotic machine groups. The mission control may be capable of executing the mission using the number of robotic machine groups.

The different advantageous embodiments may further provide a method for mission management. A mission plan may be generated. The mission plan may be sent to a number of robotic machine groups. The progress of the mission plan by the number of robotic machine groups may be monitored. Data may be received from the number of robotic machine groups about the mission plan.

The different advantageous embodiments may further provide a method for mission management. Information about a mission may be received from a number of robotic machines. A conflict in the mission may be identified. A determination may be made as to whether the conflict can be resolved.

The different advantageous embodiments may still further provide an apparatus that may include a number of robotic machine groups, a mission planner, a mission control, a wireless communications system, a logistic planner, and a reflexive planner. The mission planner may be capable of generating a mission for the number of robotic machine groups. The mission control may be capable of executing the mission using the number of robotic machine groups. The wireless communications system may be capable of providing communications with the number of robotic machine groups, the mission control, and the mission planner. The logistic planner may be capable of identifying a number of tasks to execute the mission. The reflexive planner may be capable of modifying the mission in response to a number of messages from the number of robotic machine groups.

The different advantageous embodiments may still further provide a method for generating a mission plan for a mission. Information may be retrieved from a plurality of databases. The information retrieved may include at least one of mission schedules, mission histories, and resource information. The mission plan may be decomposed into a number of tasks. A number of resources may be allocated for the number of tasks in the mission plan. The mission plan may be sent to a number of robotic machine groups. The mission plan may include the number of tasks for the mission. Progress of the mission plan may be monitored by the number of robotic machine groups. Data may be received from the number of robotic machine groups about the mission plan.

The different advantageous embodiments may provide a scalable, flexible mission planning system that is robust to planning and controlling multiple heterogeneous robotic machine groups subjected to dynamic operating conditions with time-varying mission objectives.

As a specific illustrative example, one or more of the different advantageous embodiments may be implemented, for example, without limitation, during component and subassembly manufacturing 106, system integration 108, certification and delivery 110, in service 112, and maintenance and service 114 in FIG. 1 to assemble a structure for aircraft 200. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
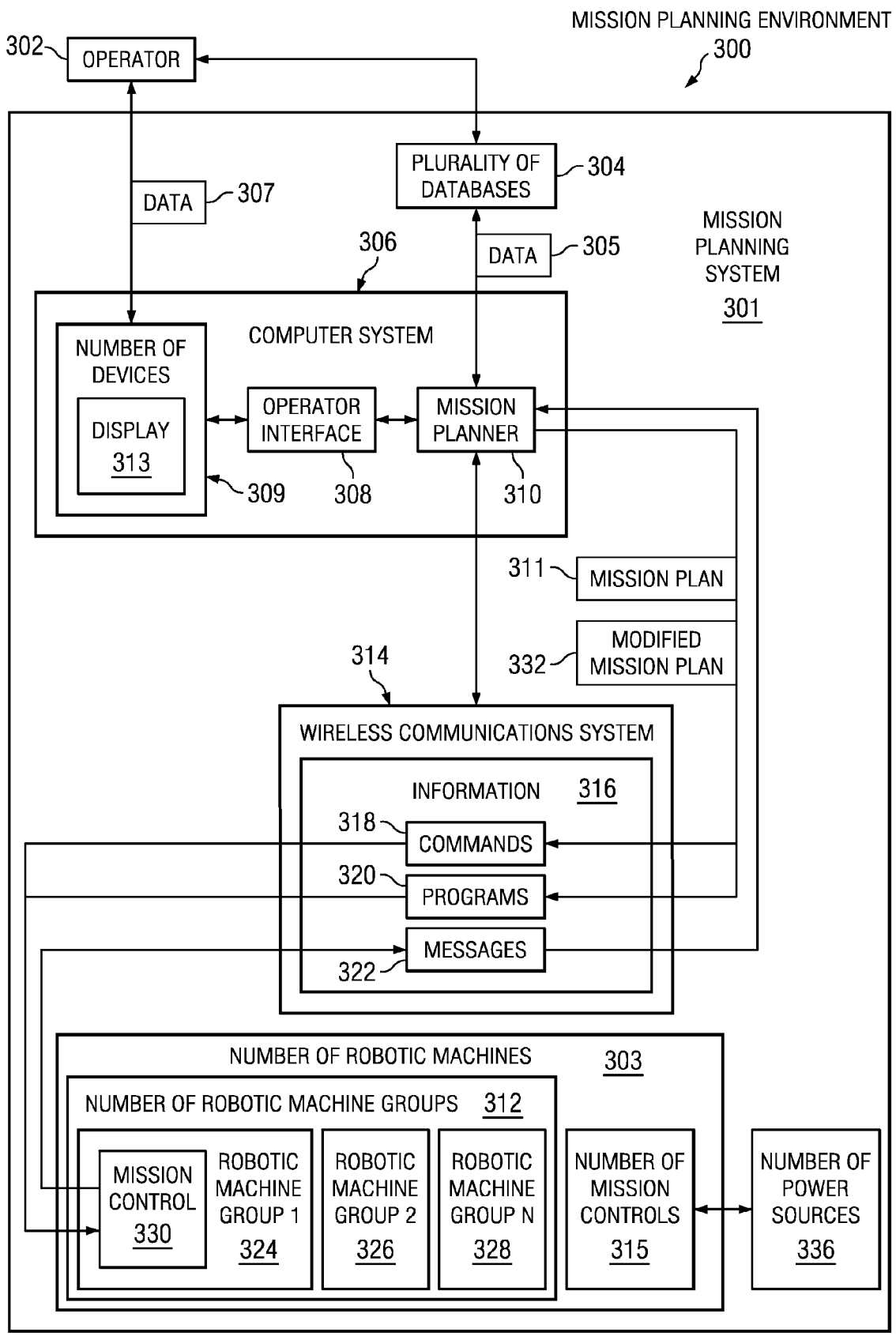
FIG. 3 is an illustration of a mission planning environment in accordance with an advantageous embodiment.

With reference now to FIG. 3, an illustration of a mission planning environment is depicted in accordance with an advantageous embodiment. Mission planning environment 300 may be any environment in which missions or operations are planned, executed, and modified using a number of robotic machines and operator 302.

Mission planning environment 300 may include mission planning system 301 and operator 302. Mission planning system 301 may be one example of a system used to plan an inspection mission to inspect aircraft 200 in FIG. 2 during maintenance and service 114 in FIG. 1, for example. Operator 302 may be, without limitation, a human operator, an autonomous machine operator, a robotic operator, or some other external system.

Mission planning system 301 may be implemented in a number of industries for a number of applications. For example, mission planning system 301 may be implemented in the aerospace industry, automotive industry, military, law enforcement, first responders, search and rescue, surveillance, and/or any other suitable industry and/or application that may utilize planning systems.

Mission planning system 301 may include plurality of databases 304, computer system 306, number of robotic machine groups 312, wireless communications system 314, and number of power sources 336. Plurality of databases 304 may include a number of databases distributed across a number of network environments that may be accessed by mission planning system 301. Computer system 306 may include operator interface 308, number of devices 309, and mission planner 310. Computer system 306 may be capable of generating information. Information may include, for example, without limitation, commands, data, programs, and/or other suitable types of information.

Operator 302 may use number of devices 309 to interact with operator interface 308. Number of devices 309 may include devices such as, without limitation, a display, dataglove, a personal digital assistant, a laptop, a joystick, a keyboard, a mouse, a touchscreen, an optical interface, a visual interface, a tactile interface, and/or any other suitable device. Display 313 may be an example of one type of device in number of devices 309 used by operator 302 to interact with operator interface 308.

In one advantageous embodiment, operator 302 may initiate a mission planning task using operator interface 308 on computer system 306. For example, operator 302 may identify a specific task or mission for mission planning system 301 to execute. Operator 302 may be local to number of robotic machine groups 312 or may be remote from number of robotic machine groups 312. For example, number of robotic machine groups 312 may be in a different location, country, or planet than operator 302, such as a number of robotic machines deployed on the moon and being controlled by operator 302 from the earth.

Mission planning system 301 may provide operator 302 with the capability to control number of robotic machine groups 312 regardless of the proximity, or lack thereof, of operator 302 to number of robotic machine groups 312. Robotic machine group 1 324, robotic machine group 2 326, and robotic machine group n 328 may be examples of a number of robotic machine groups that may be included in number of robotic machine groups 312.

In these illustrative examples, number of robotic machine groups 312 may be homogeneous and/or heterogeneous. For example, number of robotic machine groups 312 may be homogeneous when all of the robotic machine groups are substantially the same, perform substantially the same types of operations, and/or have substantially the same configuration. Number of robotic machine groups 312 may be heterogeneous when the different robotic machine groups within number of robotic machine groups 312 are different, perform different types of operations, have different configurations, and/or have other differences. In some examples, number of robotic machine groups 312 may have different configurations for performing substantially the same types of operations or different configurations for performing different types of operations.

Further, each robotic machine group within number of robotic machine groups 312 may be homogeneous or heterogeneous. For example, robotic machine group 1 324 may be homogeneous and have robotic machines that are all substantially the same. Robotic machine group 2 326 may be heterogeneous and have different types of robotic machines with different configurations for performing different types of operations. In another example, robotic machine group 2 326 may be heterogeneous and have different types of robotic machines with different configurations for performing substantially the same types of operations.

Operator 302 may use operator interface 308 to access mission planner 310 on computer system 306. Mission planner 310 may plan missions and allocate resources accordingly. A mission may be, for example, without limitation, an inspection of a structure, a search and rescue operation, a surveillance mission, a maintenance operation, and/or any other suitable mission or operation. Mission planner 310 may receive data 305 from plurality of databases 304 initiating a scheduled mission or operation. A scheduled mission or operation may be a routine operation or scheduled mission that is initiated by a date, time, or event recognized by plurality of databases 304. For example, routine maintenance on aircraft 200 in FIG. 2 may be initiated by a date, such as an annual maintenance date, for example, stored in plurality of databases 304.

Mission planner 310 may receive data 307 from operator 302 using operator interface 308 to initiate a mission or operation. Data 307 may include, without limitation, information about a number of tasks, an objective, a structure, and/or any other suitable information for a mission or operation. Mission planner 310 may receive data 307 and/or data 305, and may process the information received to generate a mission plan that allocates a number of tasks to a number of resources.

Mission plan 311 may be an example of a mission plan generated by mission planner 310. In an illustrative example, mission planner 310 may allocate one task to one robotic machine group and another task to a different robotic machine group. Mission planner 310 may monitor the mission or operation during execution and may modify the mission or operation based on feedback received from the number of resources, such as number of robotic machine groups 312, for example. As used herein, a number refers to one or more tasks, resources, and/or robotic machine groups.

Mission planner 310 may generate mission plan 311 and send mission plan 311 to number of mission controls 315 of number of robotic machine groups 312. Number of mission controls 315 may represent the individual mission controls for each robotic machine group. Each robotic machine group may have its own individual mission control. Mission planner 310 may transmit mission plan 311 using wireless communications system 314.

Wireless communications system 314 may receive and transmit information 316 between mission planner 310 and number of robotic machine groups 312. Mission plan 311 may contain commands 318 and programs 320, which are transmitted to a mission control of the designated robotic machine group, such as mission control 330 of robotic machine group 1 324. During execution of mission plan 311, mission control 330 of robotic machine group 1 324 may send messages 322 to mission planner 310.

Messages 322 may be sent, for example, if mission control 330 cannot resolve a conflict in robotic machine group 1 324 that may hinder execution of mission plan 311. Mission planner 310 may use messages 322 to modify mission plan 311 in order to resolve the conflict identified by mission control 330. Mission planner 310 may then send new commands or programs to mission control 330 to execute modified mission plan 332.

Number of power sources 336 may provide power to components of mission planning system 301, such as number of robotic machine groups 312, for example. Number of power sources 336 may include, without limitation, a battery, a mobile battery recharger, a beamed power, a networked autonomous battery recharger, energy harvesting devices, photo cells, and/or other suitable power sources.

The illustration of mission planning environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, mission planning system 301 may include an autonomous maintenance and inspection system that may reconfigure itself to perform inspection of different types of structures in a manner faster than currently available inspection systems. A structure may be, for example, aircraft 200 in FIG. 2. In another illustrative example, a structure may be, for example, without limitation, an aircraft, a spacecraft, a submarine, a surface ship, a vehicle, a tank, a building, a manufacturing floor, an engine, and/or some other suitable type of structure.

In yet another illustrative example, a structure may be a part of a structure. For example, in the illustrative example of an aircraft, a part of a structure may be, for example, without limitation, a wing, fuselage, engine, and/or some other suitable part of an aircraft structure.

Figure 4:
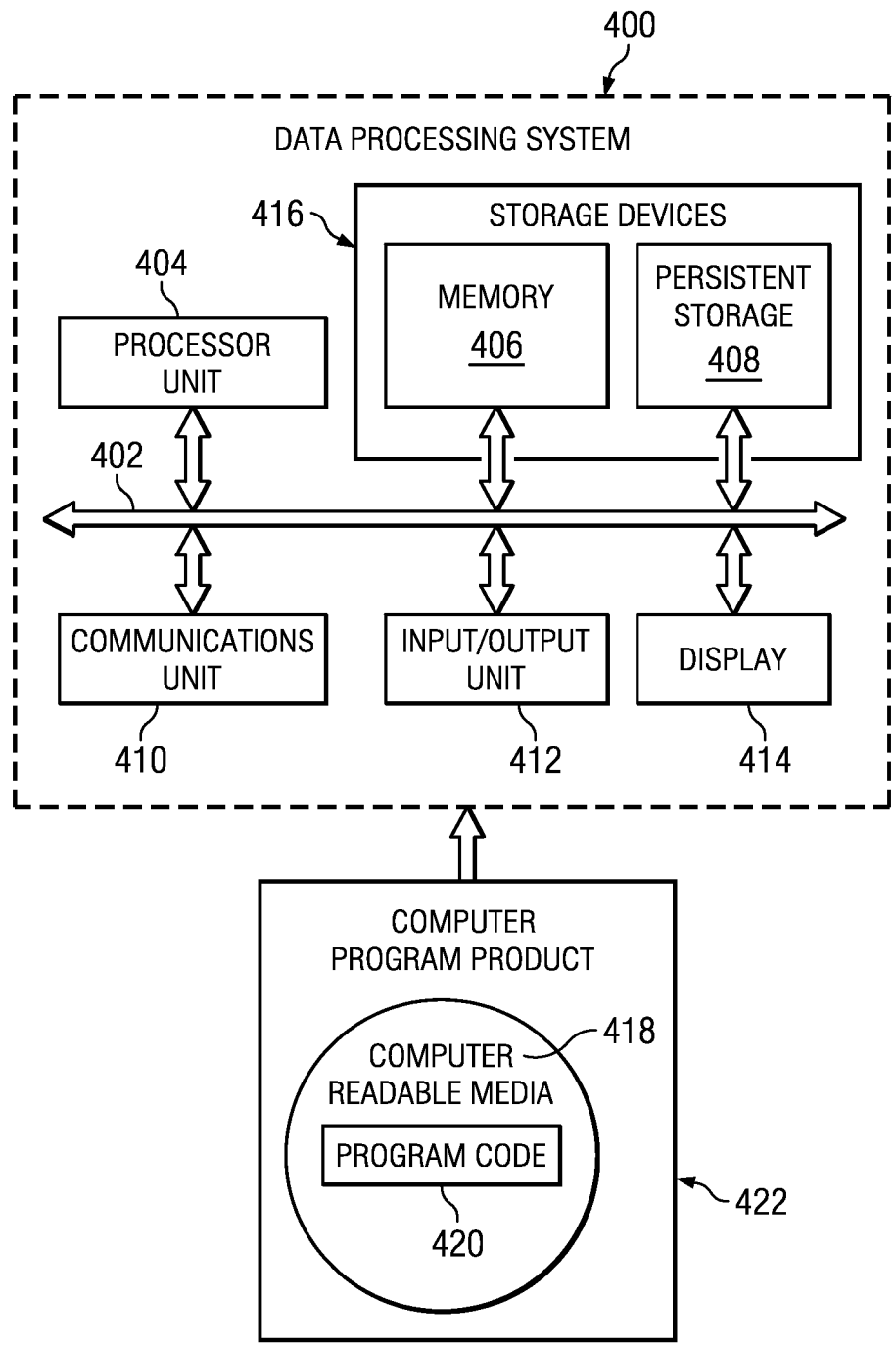
FIG. 4 is an illustration of a data processing system in accordance with an illustrative embodiment.

With reference now to FIG. 4, an illustration of a data processing system is depicted in accordance with an advantageous embodiment. Data processing system 400 may be used to implement different computers and data processing systems within a mission planning environment, such as mission planning system 301 and/or computer system 306 in FIG. 3.

In this illustrative example, data processing system 400 includes communications fabric 402, which provides communications between processor unit 404, memory 406, persistent storage 408, communications unit 410, input/output (I/O) unit 412, and display 414. Depending on the particular implementation, different architectures and/or configurations of data processing system 400 may be used.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may be any piece of hardware that may be capable of storing information such as, for example, without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 420 may be located in a functional form on computer readable media 418 that may be selectively removable and may be loaded onto or transferred to data processing system 400 for execution by processor unit 404. Program code 420 and computer readable media 418 form computer program product 422 in these examples. In one example, computer readable media 418 may be in a tangible form such as, for example, an optical or magnetic disk that may be inserted or placed into a drive or other device that may be part of persistent storage 408 for transfer onto a storage device, such as a hard drive, that may be part of persistent storage 408.

In a tangible form, computer readable media 418 also may take the form of a persistent storage, such as a hard drive, a thumb drive, or a flash memory that may be connected to data processing system 400. The tangible form of computer readable media 418 may also be referred to as computer recordable storage media. In some instances, computer readable media 418 may not be removable.

Alternatively, program code 420 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 420 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 420 may be a server computer, a client computer, or some other device capable of storing and transmitting program code 420.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 may be any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
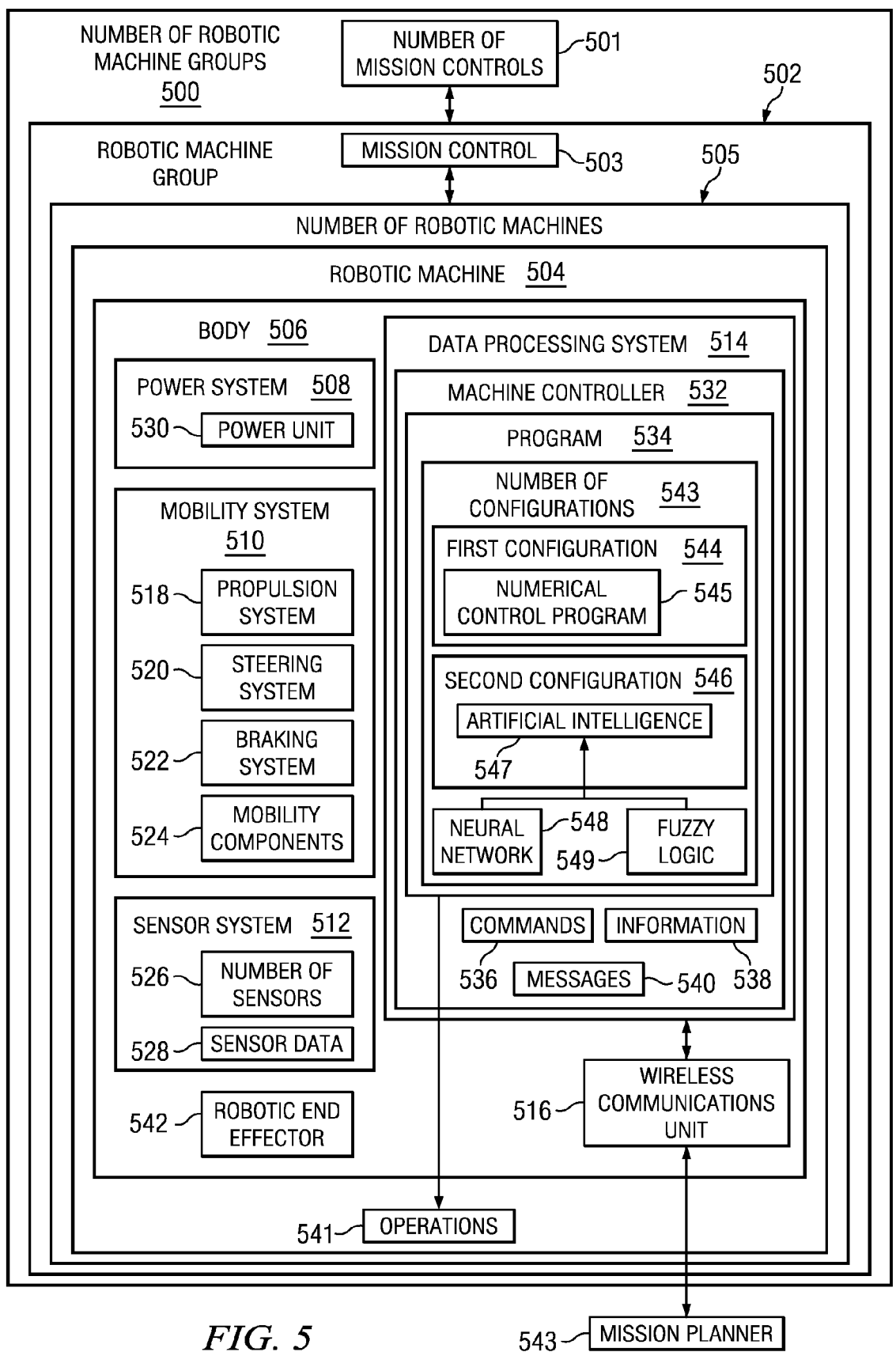
FIG. 5 is an illustration of a number of robotic machine groups in accordance with an advantageous embodiment.

With reference now to FIG. 5, an illustration of a number of robotic machine groups is depicted in accordance with an advantageous embodiment. Number of robotic machine groups 500 may be an example of one manner in which number of robotic machine groups 312 in FIG. 3 may be implemented.

Number of robotic machine groups 500 may include number of mission controls 501. Each machine group in number of robotic machine groups 500 may have its own mission control capable of receiving information from a mission planner, such as mission planner 310 in FIG. 3. Robotic machine group 502 may be an example of one implementation of a robotic machine group in number of robotic machine groups 500. Robotic machine group 502 may include mission control 503 and number of robotic machines 505. Mission control 503 may receive information directed to robotic machine group 502 from a mission planner, and transmit messages from robotic machine group 502 to the mission planner.

Mission control 503 may monitor the progress of a mission or operation tasked to robotic machine group 502, the interaction between number of robotic machines 505 within robotic machine group 502, and the status of each robotic machine in number of robotic machines 505. Mission control 503 may gather information while monitoring the progress of a mission or operation and the individual machines. The information gathered may indicate a conflict in the mission plan, which mission control 503 may be capable of solving. Mission control 503 may run a negotiation algorithm to determine whether a solution is available locally, and if a solution is available locally, may generate a number of commands to number of robotic machines 505 to implement the solution. If a solution is not available locally, mission control 503 may send a message to mission planner 543 with the information about the conflict in the mission plan. Mission planner 543 may be an example of one implementation of mission planner 310 in FIG. 3.

Robotic machine 504 may be an example of one machine in number of robotic machines 505. Robotic machine 504 may include, without limitation, body 506, power system 508, mobility system 510, sensor system 512, data processing system 514, wireless communications unit 516, robotic end effector 542, and/or other suitable components.

Body 506 may provide a structure and/or housing for which different components may be located on and/or in robotic machine 504. Power system 508 may provide power to operate robotic machine 504. Power system 508 may generate power using power unit 530. Power unit 530 may be an illustrative example of number of power sources 336 in FIG. 3. Power unit 530 may be rechargeable, removable, and/or replaceable. Power unit 530 may be changed when power unit 530 becomes depleted.

Power unit 530 may be, for example, without limitation, a battery and/or some other suitable type of power unit. For example, power unit 530 may be a wireless transfer unit capable of receiving power without using wires.

Mobility system 510 may provide mobility for robotic machine 504. Mobility system 510 may take various forms. Mobility system 510 may include, for example, without limitation, propulsion system 518, steering system 520, braking system 522, and mobility components 524. In these examples, propulsion system 518 may propel or move robotic machine 504 in response to commands from machine controller 532 in data processing system 514.

Propulsion system 518 may maintain or increase the speed at which robotic machine 504 moves in response to instructions received from machine controller 532 in data processing system 514. Propulsion system 518 may be an electrically controlled propulsion system. Propulsion system 518 may be, for example, without limitation, an internal combustion engine, an internal combustion engine/electric hybrid system, an electric engine, or some other suitable propulsion system.

Steering system 520 may control the direction or steering of robotic machine 504 in response to commands received from machine controller 532 in data processing system 514. Steering system 520 may be, for example, without limitation, an electrically controlled hydraulic steering system, an electrically driven rack and pinion steering system, a differential steering system, or some other suitable steering system.

Braking system 522 may slow down and/or stop robotic machine 504 in response to commands received from machine controller 532 in data processing system 514. Braking system 522 may be an electrically controlled braking system. This braking system may be, for example, without limitation, a hydraulic braking system, a friction braking system, or some other suitable braking system that may be electrically controlled.

Mobility components 524 may provide robotic machine 504 with the capability to move in a number of directions and/or locations in response to instructions received from machine controller 532 in data processing system 514 and executed by propulsion system 518, steering system 520, and braking system 522. Mobility components 524 may be, for example, without limitation, wheels, tracks, feet, rotors, propellers, wings, and/or other suitable components.

Sensor system 512 may include number of sensors 526 and sensor data 528. For example, number of sensors 526 may include, without limitation, a camera, a scanner, an electromechanical fatigue sensor, a microelectromechanical system (MEMS) device, and/or some other suitable type of sensor, as shown in more illustrative detail in FIG. 7. Sensor data 528 may be information collected by number of sensors 526.

Robotic end effector 542 may be one or more robotic end effectors, also known as robotic peripherals, robotic accessories, robot tools or robotic tools, end-of-arm tooling, and/or end-of-arm devices. Robotic end effector 542 may include, for example, without limitation, automatic tool changes, robotic grippers, robotic deburring tools, collision sensors, robotic paint guns, robotic arc welding guns, rotary joints, vacuum cups, three-jaw chucks, nippers, high-speed spindles, cylinders, and/or drills.

Data processing system 514 may control the operation of robotic machine 504 using machine controller 532 to execute program 534 and transmit commands 536 in these examples. Program 534 may be received from a mission planner, such as mission planner 310 in FIG. 3, through wireless communications unit 516 and/or some other source. In these illustrative examples, wireless communications unit 516 may provide the capability to transfer information, such as program 534 and commands 536, between robotic machine 504 and other robotic machines within robotic machine group 502.

In one advantageous embodiment, program 534 and commands 536 are illustrative examples of programs 320 and commands 318 in FIG. 3, generated by mission planner 310 in FIG. 3, and transmitted over wireless communications system 314 to number of robotic machine groups 312 in FIG. 3. In another advantageous embodiment, program 534 and commands 536 may be generated by data processing system 514 based on information 538 received through wireless communications unit 516 and/or some other source. Information 538 may be, for example, information about routine operations or planned missions such as, for example, without limitation, maintenance requirements for a structure.

In this illustrative example, mission control 503 may send instructions to program 534 for robotic machine 504 to perform operations 541. These instructions may provide parameters for performing an operation or may provide a portion of the parameters for performing an operation. In other examples, these instructions may not provide parameters for performing an operation and may allow program 534 to select all or a portion of these parameters for performing the operation.

Program 534 may have number of configurations 543 for controlling the performance of operations 541. Each of number of configurations 543 may include, for example, without limitation, at least one of a number of processes, programming code, a number of algorithms, a number of tools, a number of controls, and/or a number of other suitable elements for a configuration of program 534.

For example, without limitation, first configuration 544 of program 534 may use numerical control program 545. In these examples, robotic machine 504 may be a numerically-controlled machine. In particular, numerical control program 545 may be run to control an operation in operations 541 based on instructions from mission control 503.

As one illustrative example, mission control 503 may send instructions to numerical control program 545 for robotic machine 504 to drill a number of holes in a predetermined location. All input parameters for performing this operation may be provided by these instructions from mission control 503. In other examples, numerical control program 545 may be run to capture an image of a workpiece at a predetermined location on a workstation. In these examples, numerical control program 545 may perform substantially no decision-making for robotic machine 504.

In other illustrative examples, numerical control program 545 may be configured to control operations 541 based on a set of parameters. These parameters may take into account at least one of power, speed, efficiency, safety, situational awareness, and/or some other suitable factors. Numerical control program 545 may be run with some amount of decision-making to perform operations 541 within the set of parameters.

As another example, second configuration 546 of program 534 may use artificial intelligence 547 to control operations 541. Artificial intelligence 547 may provide robotic machine 504 with capabilities such as, for example, without limitation, decision-making, deduction, reasoning, problem-solving, planning, learning, and/or other capabilities. Decision-making may involve using a set of rules to perform tasks.

For example, without limitation, program 534 may receive instructions from mission control 503 for robotic machine 504 to attach two components to each other based on a set of rules. Artificial intelligence 547 may be used to perform this operation instead of numerical control program 545. Artificial intelligence 547 may be configured to evaluate the set of rules and make decisions based on the set of rules.

In another example, mission control 503 may send instructions to program 534 for robotic machine 504 to drill a number of holes in a structure. Artificial intelligence 547 may be used to select parameters of this drilling operation. These parameters may include, for example, without limitation, the pattern of the number of holes to be drilled, the location of the number of holes to be drilled, the size of the number of holes to be drilled, and/or other parameters for the drilling operation. In this example, artificial intelligence 547 may select the parameters for the drilling operation based on a set of rules and/or policies.

With second configuration 546 for program 534, robotic machine 504 may take the form of an autonomous robotic machine. In other words, robotic machine 504 may have a desired level of autonomy using artificial intelligence 547 to perform operations 541 as compared to using numerical control program 545. For example, without limitation, artificial intelligence 547 may perform operations 541 with little or no input and/or commands from external sources.

In other number of configurations 543 of program 534, program 534 may comprise neural network 548 and/or fuzzy logic 549. Neural network 548 may be an artificial neural network in this example. In these illustrative examples, neural network 548 and/or fuzzy logic 549 may allow robotic machine 504 to perform operations 541 with a desired level of autonomy. In some examples, second configuration 546 of program 534 may comprise neural network 548 and fuzzy logic 549 to provide artificial intelligence 547. In some advantageous embodiments, a configuration in number of configurations 543 for program 534 may comprise numerical control program 545, neural network 548, and fuzzy logic 549.

Data processing system 514 further receives sensor data 528 from sensor system 512 and generates messages 540. Messages 540 may be transmitted through wireless communications unit 516 to another robotic machine within robotic machine group 502 or another component and/or device in mission planning environment 300 in FIG. 3.

Robotic machine 504 may provide a capability to move to different locations without requiring cables, fixed attachments, rails, and/or other components currently used by robotic machines in various systems.

The illustration of number of robotic machine groups 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, machine controller 532 may be unnecessary. Machine controller 532 may be unnecessary if data processing system 514 directly receives program 534 and commands 536 from a machine controller located remotely from robotic machine 504, such as mission control 503. In yet other advantageous embodiments, robotic machine 504 may include additional systems not depicted here for operations such as, without limitation, inspection, maintenance, surveillance, search and rescue, and/or any other suitable operation or mission.

In some advantageous embodiments, number of robotic machines 505 in robotic machine group 502 may include a number of robotic machines configured to perform one type of operation and a number of robotic machines configured to perform another type of operation. In other advantageous embodiments, all robotic machines in robotic machine group 502 may be configured to perform substantially the same types of operations, while other robotic machine groups in number of robotic machine groups 500 may be configured to perform different types of operations.

Figure 6:
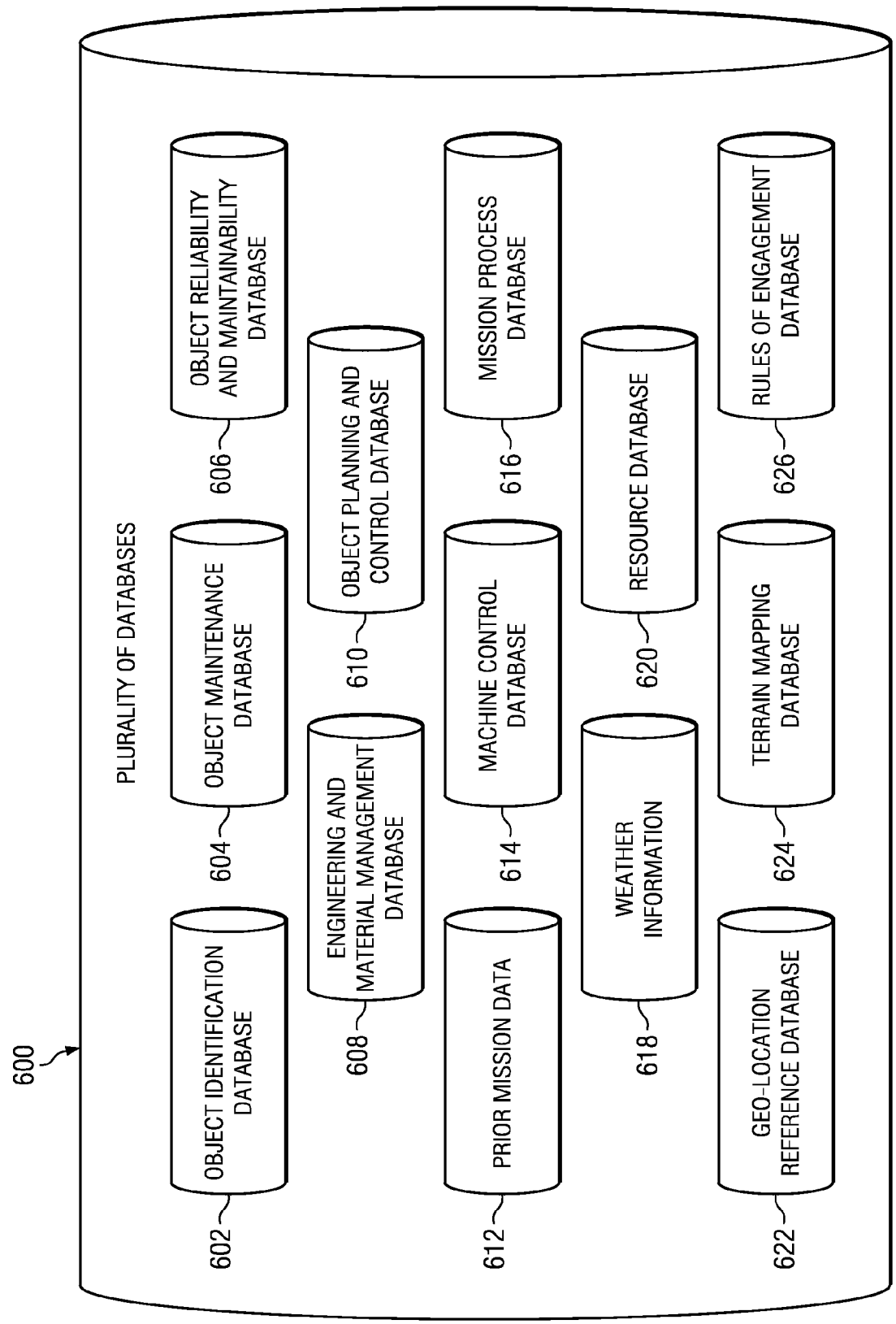
FIG. 6 is an illustration of a plurality of databases in accordance with an advantageous embodiment.

With reference now to FIG. 6, an illustration of a plurality of databases is depicted in accordance with an advantageous embodiment. Plurality of databases 600 may be an example of one implementation for plurality of databases 304 in FIG. 3.

Plurality of databases 600 may include object identification database 602, object maintenance database 604, object reliability and maintainability database 606, engineering and material management database 608, object planning and control database 610, prior mission data 612, machine control database 614, mission process database 616, weather information 618, resource database 620, geo-location reference database 622, terrain mapping database 624, rules of engagement database 626, and/or other suitable information.

Object identification database 602 may contain the identification information for a number of different types and models of objects. In an illustrative example, identification information for different aircraft models may include, without limitation, major and minor model numbers, tail numbers, customer unique numbers, engineering and manufacturing effectivity numbers, and/or any other suitable information.

Object maintenance database 604 may contain information about the maintenance history for a given object identified in object identification database 602. The maintenance history of an object may be used in conjunction with the maintenance planning data in object planning and control database 610 to determine what regulatory and/or compliance measures may need to be taken in the next maintenance session in order to maintain regulatory compliance. Object maintenance database 604 may also contain past modification information, component or configuration options that are exercised, status on service bulletin incorporation, past repair information, any manufacturing deviations detected in previous inspections of the object, and/or any other suitable information.

Object reliability and maintainability database 606 may contain object specific information about repair consumables, replacement part availability, regulatory requirements for repairs and replacement parts, mean time between failure information, mean time to repair/replace information for a given object, and/or any other suitable information. For example, in the illustrative example of an aircraft, Air Transport Association (ATA) chapter assignments defining the hierarchy of the aircraft system for a particular aircraft may be contained within object reliability and maintainability database 606.

Engineering and material management database 608 may contain object configuration information, electronic geometry files for a given object, and/or any other suitable information. In the illustrative example of an aircraft, engineering and material management database 608 may contain computer aided three-dimensional interactive application (CATIA) geometry files and aircraft configuration information for a specific model and/or type of aircraft.

Object planning and control database 610 may contain planning data for each object model defined in object identification database 602. In an illustrative example of an aircraft, this planning data may describe what preventative maintenance may be performed to maintain airworthiness and federal compliance for the given aircraft. This information may include regulatory requirements, service bulletins, and/or other suitable information. Planning data may also include, without limitation, aircraft historical usage information, past and future near-term scheduled flight routes, and future maintenance availability schedules, for example.

Prior mission data 612 may contain stored information transmitted from a number of robotic machines and/or a number of robotic machine groups from past missions or operations. Prior mission data 612 may include object identifiers to uniquely identify prior mission data for a particular object, place, and/or person.

Machine control database 614 may contain a number of stored programs for execution by a mission planner, such as mission planner 310 in FIG. 3, for example.

Mission process database 616 may contain a number of different types of processes for executing a mission or operation, such as mission plan 311 in FIG. 3, for example. Mission process database 616 may include processes such as, without limitation, inspection processes, search processes, surveillance processes, maintenance processes, and/or any other suitable process.

Weather information 618 may contain information about weather patterns for an area or location, current weather information, forecasted weather information, and/or any other suitable weather information.

Resource database 620 may contain information about the number of resources available in a mission planning environment, such as mission planning environment 300 in FIG. 3. The number of resources may include, for example, without limitation, number of robotic machine groups 312 in FIG. 3. Resource database 620 may include information about which resources are currently available, which resources are currently being deployed, which resources are out of service, the location of the number of resources, and/or any other suitable information about resources.

Geo-location reference database 622 may contain location information about a number of robotic machine groups, such as number of robotic machine groups 312 in FIG. 3, for example. Geo-location reference database 622 may include geographical location information related to a mission or operation such as, without limitation, location of a structure, location for a mission execution, location of a mission objective, location of a destination for a number of robotic machines, and/or any other suitable location information, for example.

Terrain mapping database 624 may contain a number of terrain maps for a number of locations. Terrain maps may include geo-location references that are capable of being identified using geo-location reference database 622, for example.

Rules of engagement database 626 may contain information about authorized tasks or actions that a number of robotic machine groups may execute in response to a number of events. For example, in a search and rescue operation, an event such as a hostile encounter may trigger a robotic machine to rules of engagement database 626 to select from a number of acceptable action options.

The illustration of plurality of databases 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional databases not shown may be included in plurality of databases 600. In some advantageous embodiments, object identification database 602 may be integrated with object maintenance database 604, for example.

Figure 7:
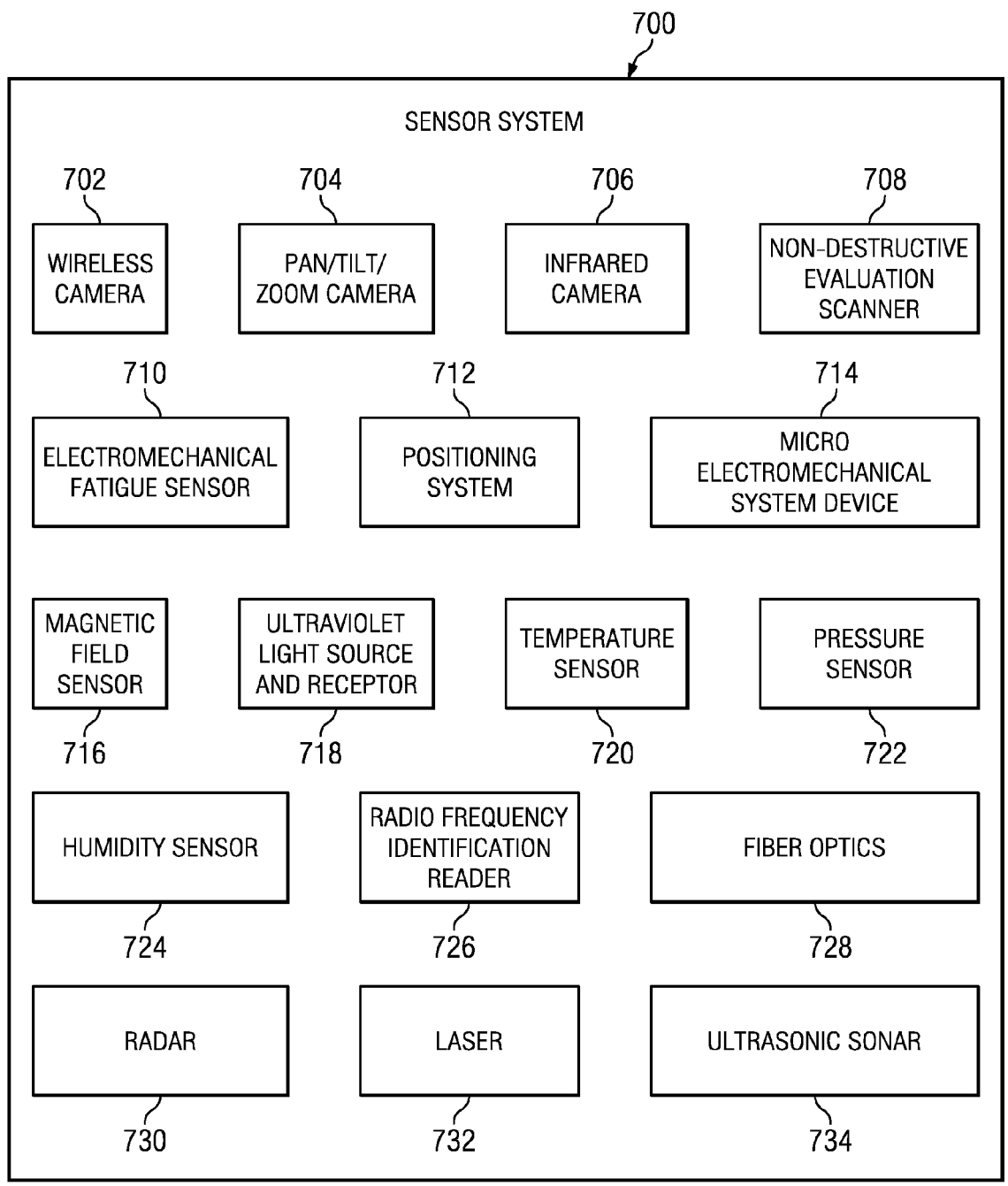
FIG. 7 is an illustration of a sensor system in accordance with an advantageous embodiment.

With reference now to FIG. 7, an illustration of a sensor system is depicted in accordance with an advantageous embodiment. Sensor system 700 may be an example of one implementation of sensor system 512 in FIG. 5.

Sensor system 700 may be located on a number of robotic machines, such as number of robotic machines 505 in robotic machine group 502 of FIG. 5. Sensor system 700 may detect parameters such as, for example, without limitation, visual information, temperature information, humidity information, radiation outside the visual spectrum, structural frequency response information, non-visible light source reflection, air pressure, fluid pressure, gaseous pressure, strain or amount of deflection in a component, and/or any other suitable parameter.

Sensor system 700 may include wireless camera 702, pan/tilt/zoom camera 704, infrared camera 706, non-destructive evaluation scanner 708, electromechanical fatigue sensor 710, positioning system 712, micro electromechanical system (MEMS) device 714, magnetic field sensor 716, ultraviolet light source and receptor 718, temperature sensor 720, pressure sensor 722, humidity sensor 724, radio frequency identification reader 726, fiber optics 728, radar 730, laser 732, ultrasonic sonar 734, and/or other suitable sensor components.

Wireless camera 702 may be any type of wireless visible light camera that may capture visual information, such as still and/or moving images, for example. Wireless camera 702 may transmit the images over a wireless connection to a computer system. In an illustrative example, wireless camera 702 may be an indoor WiFi 802.11b wireless camera used for remote monitoring and surveillance over either local area networks or the Internet.

Pan/tilt/zoom camera 704 may be any camera capable of panning, tilting, and zooming in order to capture visual information, such as still and/or moving images, for example. Panning may refer to the horizontal movement or rotation of the camera. Tilting may refer to the vertical movement or rotation of the camera. Zooming may refer to the ability to vary the focal length and angle of the lens of the camera.

Infrared camera 706 may form an image using infrared radiation, rather than visible light. In the illustrative example of an aircraft, infrared camera 706 may be utilized to improve an acquired image contrast ratio based on thermal intensity, thus increase the likelihood of detecting overheated items, such as aircraft brakes, bearings, gears, or components within an engine during an inspection operation, for example. In one illustrative example, infrared camera 706 may detect overheated aircraft brakes by showing a noticeable contrast to nearby and surrounding vehicle structures in relation to the aircraft brakes when viewed in the infrared spectrum. The noticeable contrast may be due to a temperature difference in the aircraft brake materials from the materials of the surrounding structures, for example.

Non-destructive evaluation scanner 708 may use electromagnetic radiation and microscopy to examine surfaces in detail. Non-destructive evaluation scanner 708 may be used to detect radiation outside the visual spectrum. The examination may often be reasonably obvious, especially when different light sources are used. For example, glancing light on a surface of a structure may reveal details not immediately obvious to sight. Types of electromagnetic radiation used may include, without limitation, X-rays, ultrasound, and/or other suitable electromagnetic radiation.

Electromechanical fatigue sensor 710 may use piezoelectric devices to provide information about the airplane's structural condition that results from long-term mechanical loading. Electromechanical fatigue sensor 710 may be used to detect structural frequency response information, for example.

Positioning system 712 may identify the location of the robotic machine with respect to other objects in the mission planning environment. Positioning system 712 may be any type of vision-based motion capture or radio frequency triangulation scheme based on signal strength and/or time of flight. Examples include, without limitation, the Global Positioning System, Glonass, Galileo, cell phone tower relative signal strength, and/or any other suitable system. Position may be typically reported as latitude and longitude with an error that depends on factors, such as, without limitation, ionospheric conditions, satellite constellation, signal attenuation from environmental factors, and/or other suitable factors.

Micro electromechanical system (MEMS) device 714 may be used to sense such parameters as pressure, temperature, humidity, acceleration, and rotation using the small, lightweight, and low-power nature of MEMS technologies. This also includes nanoelectromechanical systems (NEMS), which are similar to MEMS, but smaller, and may be used to sense small displacements and forces at the molecular scale.

Magnetic field sensor 716 may be a sensor used to measure the strength and/or direction of the magnetic field in the vicinity of magnetic field sensor 716. Magnetic field sensor 716 may also measure variations in magnetic fields near the sensor. In one illustrative example, magnetic field sensor 716 may non-intrusively measure electric current flowing through a nearby electrical circuit.

Ultraviolet light source and receptor 718 may emit and detect ultraviolet light. Ultraviolet light may be electromagnetic radiation with a wavelength shorter than that of visible light. Ultraviolet light may be used to detect inconsistencies during an inspection operation such as, for example, fluid leaks or other residues that are difficult to identify in a visible light spectrum. Ultraviolet light source and receptor 718 may detect the bounce-back of ultraviolet light wavelengths from the emission of ultraviolet light. Ultraviolet light source and receptor 718 may transform the bounce-back wavelengths into a visible light spectrum viewable by a human eye.

Temperature sensor 720 may detect the ambient temperature of the operating environment around temperature sensor 720. In an illustrative example, temperature sensor 720 may be a thermocouple or thermistor.

Pressure sensor 722 may measure the pressure of force in an operating environment around pressure sensor 722. Pressure sensor 722 may detect the pressure of force caused by, for example, without limitation, air pressure, fluidic pressure, and/or gaseous pressure. In an illustrative example, pressure sensor 722 may be a fiber optic, mechanical deflection, strain gauge, variable capacitive, or silicon piezoresistive pressure sensor.

Humidity sensor 724 may measure relative humidity in an operating environment around humidity sensor 724. In an illustrative example, humidity sensor 724 may be a hygrometer, resistive or capacitive relative humidity sensor.

Radio frequency identification reader 726 may rely on stored data and remotely retrieve the data using devices, such as radio frequency identification (RFID) tags or transponders. Radio frequency identification tags may be located, for example, without limitation, on equipment, on a structure, on a number of robotic machines, on a power source, and/or any other suitable location. In the illustrative example of an aircraft, radio frequency identification tags may be located on required equipment such as, without limitation, life vests, batteries, a black box, and/or other suitable equipment. In this illustrative example, radio frequency identification reader 726 may detect the radio frequency identification tags located on various equipment and retrieve data in order for sensor system 700 to detect whether or not required equipment is found on and/or within the object being inspected during an inspection operation.

Fiber optics 728 may contain a collection of optical fibers that permit transmission over longer distances and at higher data rates than other forms of communications. Fiber optics 728 may be used, for example, without limitation, to measure strain and/or detect the amount of deflection in a component. Fiber optics 728 may be immune to electromagnetic interference. In an illustrative example, fiber optics may be used in a borescope to acquire images or video of hard-to-reach areas within an airplane structure during an inspection operation, for example.

Radar 730 may use electromagnetic waves to identify the range, altitude, direction, or speed of both moving and fixed objects. Radar 730 is well known in the art, and may be used in a time-of-flight mode to calculate distance to an object, as well as Doppler mode to calculate the speed of an object.

Laser 732 may emit light or electromagnetic radiation in a spatially coherent manner. Spatial coherence may refer to light that may either be emitted in a narrow, low-divergence beam, or may be converted into a narrow, low-divergence beam with the help of optical components, such as lenses, for example.

Ultrasonic sonar 734 may use sound propagation on an ultrasonic frequency to measure the distance to an object by measuring the time from transmission of a pulse to reception and converting the measurement into a range using the known speed of sound. Ultrasonic sonar 734 is well known in the art and can also be used in a time-of-flight mode or Doppler mode, similar to radar 730.

The illustration of sensor system 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional sensors not shown may be included in sensor system 700. In another example, in some advantageous embodiments, sensors may be integrated together in a sensor suite, such as electromechanical fatigue sensor 710 and micro electromechanical system device 714, for example.

Figure 8:
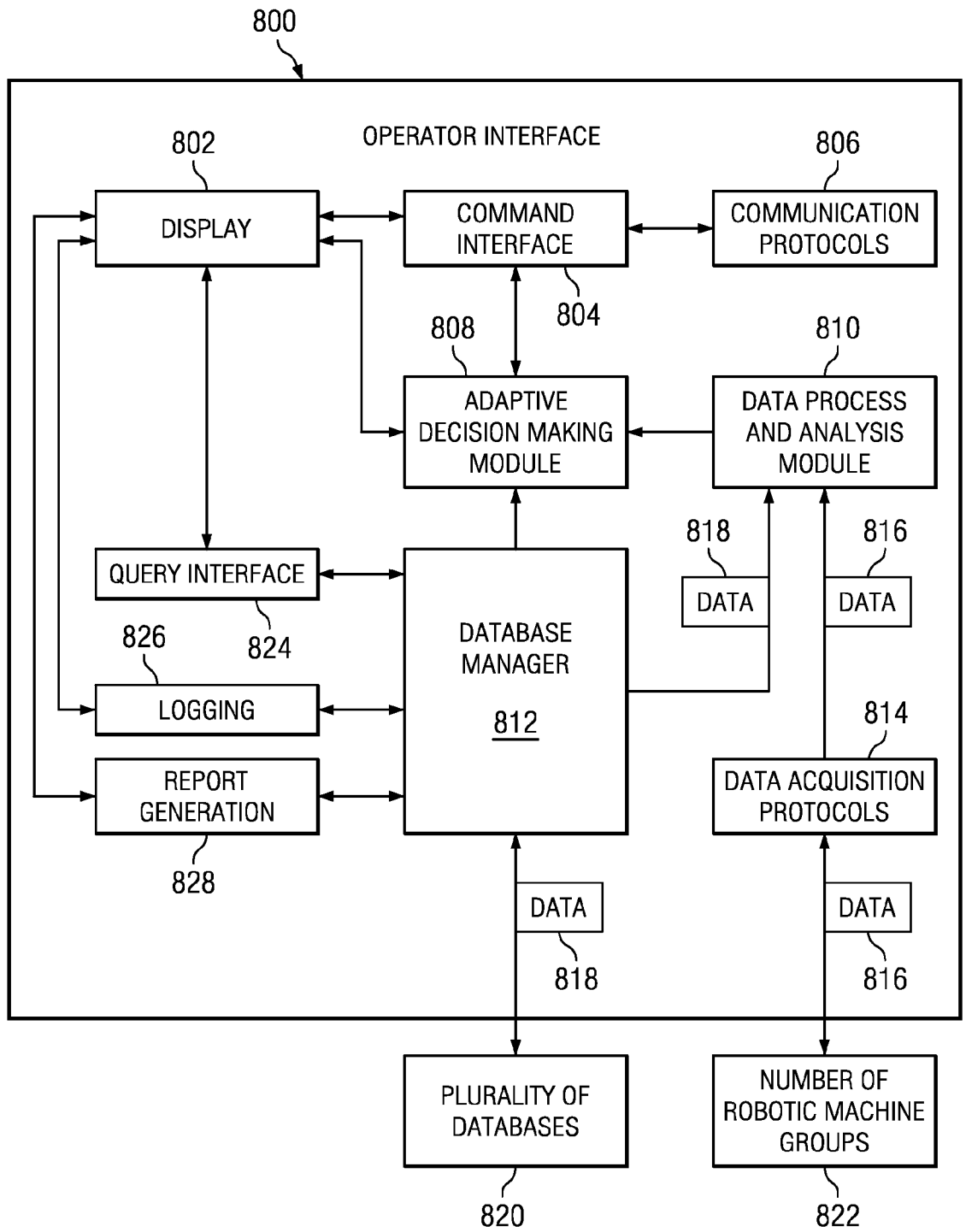
FIG. 8 is an illustration of an operator interface in accordance with an advantageous embodiment.

With reference now to FIG. 8, an illustration of an operator interface is depicted in accordance with an advantageous embodiment. Operator interface 800 may be an example of one implementation of operator interface 308 in FIG. 3.

Operator interface 800 may include display 802, command interface 804, communication protocols 806, adaptive decision making module 808, data process and analysis module 810, database manager 812, data acquisition protocols 814, and query interface 824. Display 802 may be an example of one implementation of display 414 in FIG. 4. Display 802 also may be an example of display 313 in number of devices 309 in FIG. 3.

Command interface 804 may interpret commands from an operator, such as operator 302 in FIG. 3, sent using number of devices 309 and may output data to the operator using display 802 or other devices, for example. Communication protocols 806 may inform command interface 804 about how to interact with the other components of operator interface 800 and the other components of mission planning system 301 in FIG. 3. Communication protocols 806 may depend upon the communication capabilities used by mission planning system 301, such as wireless communications system 314 in FIG. 3, for example.

Adaptive decision making module 808 may present issues and solutions based on results from determinations made by data process and analysis module 810 to the operator over display 802. Adaptive decision making module 808 may learn and accumulate knowledge from determinations made by data process and analysis module 810 and decisions made by operator 302 in FIG. 3 using display 802 and command interface 804.

Data process and analysis module 810 may analyze the information received by data acquisition protocols 814 and send the results to adaptive decision making module 808. The information received by data acquisition protocols 814 may be received from number of robotic machine groups 822, for example.

Database manager 812 may be capable of accessing plurality of databases 820 to retrieve data 818. Plurality of database 820 may be an example of one implementation of plurality of databases 304 in FIG. 3, for example. In one illustrative example, database manager 812 may send data 818 to data process and analysis module 810 to be analyzed.

In another illustrative example, an operator using display 802 may access query interface 824 to query database manager 812 for specific information. Database manager 812 may search plurality of databases 820 in order to retrieve data 818 in response to a query by an operator. In yet another illustrative example, the operator may use display 802 to access logging 826.

Logging 826 may be a sign-on protocol for authorizing the operator to access operator interface 800, such as a single sign-on protocol, for example. Logging 826 may use database manager 812 to access plurality of databases 820 in order to retrieve authorized operator information or sign-on information in order to allow the operator access to operator interface 800.

An operator may also use display 802 to access report generation 828. Report generation 828 may be used to run reports on information contained in plurality of databases 820, for example. Report generation 828 may use database manager 812 to access plurality of databases 820 and generate a report to present over display 802 to an operator.

Data acquisition protocols 814 may receive data 816 from number of robotic machine groups 822 and may send data 816 to data process and analysis module 810. Data process and analysis module 810 may analyze data 816 and send the results of the analysis to adaptive decision making module 808. Adaptive decision making module 808 may then present decisions and/or options to the operator using display 802. Adaptive decision making module 808 may enable an operator to understand a situation and make informed decisions by combining the data or information coming from number of robotic machine groups 822 and extracting information in order of relevance or importance. This combination of data and prioritization of information extraction may enable an operator to take action or make decisions with access to real-time information.

In another illustrative embodiment, adaptive decision making module 808 may be able to determine whether a decision to be made or issue to be resolved is critical or non-critical. A critical decision may be a decision that must be made or resolved by an operator. A non-critical decision may be a decision that can be made or resolved by adaptive decision making module 808. The determination as to the type of decision may be made by adaptive decision making module 808 based on information from plurality of databases 820 retrieved using database manager 812. For example, plurality of databases 820 may contain a table of non-critical decisions or issues, a rule-based system for deciding whether an issue or decision is critical or non-critical, and/or any other suitable information for enabling adaptive decision making module 808 to make a decision as to the type of issue presented by data process and analysis module 810.

When adaptive decision making module 808 determines that an issue is non-critical, adaptive decision making module 808 may make a decision or resolve the issue using a number of factors. The number of factors may include, without limitation, economic concerns, safety, job performance, robotic machine performance, robotic machine status, efficiency, and/or any other suitable factor. Adaptive decision making module 808 may make decisions using a number of different types of decision making logic such as, without limitation, rule-based, model-based, statistical, data driven, fuzzy logic, neural network, and/or any other suitable method for decision making.

The illustration of operator interface 800 in FIG. 8 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in operator interface 800.

Figure 9:
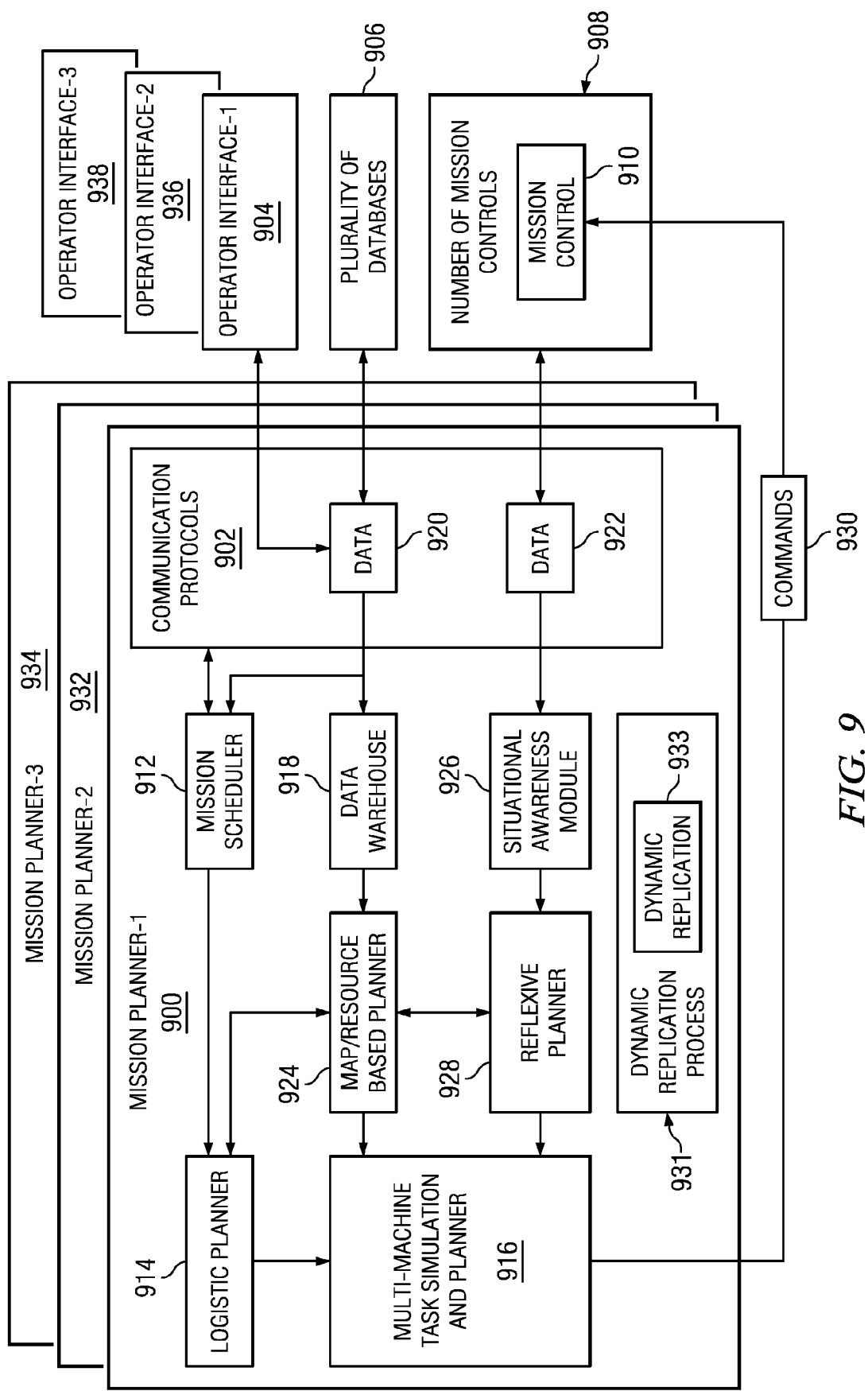
FIG. 9 is an illustration of a mission planner in accordance with an advantageous embodiment.

With reference now to FIG. 9, an illustration of a mission planner is depicted in accordance with an advantageous embodiment. Mission planner-1 900 may be an example of one implementation of mission planner 310 in FIG. 3.

Mission planner-1 900 may include communication protocols 902. Communication protocols 902 may query and receive data from other components of a mission planning system, such as operator interface-1 904, plurality of databases 906, and number of mission controls 908, for example. Mission planner-1 900 may also include, without limitation, mission scheduler 912, logistic planner 914, multi-machine task simulation and planner 916, data warehouse 918, map/resource based planner 924, situational awareness module 926, and reflexive planner 928.

Mission scheduler 912 may retrieve data, such as data 920, from plurality of databases 906, which may include mission schedules, mission histories, and resource information. Mission schedules may be, for example, without limitation, a maintenance schedule. Mission histories may be, for example, without limitation, a service or maintenance history for an object, such as an aircraft.

Resource information may include, for example, without limitation, object usage, replacement part availability, repair consumables, and/or other suitable resource information. Mission scheduler 912 may be schedule driven, event driven, or preventative, for example. In an illustrative example, if mission scheduler 912 is schedule driven, data 920 from plurality of databases 906 may indicate that a scheduled maintenance is due on an object, such as an aircraft.

Mission scheduler 912 may then identify the maintenance schedule to confirm the scheduled maintenance, identify the maintenance history to identify past maintenance on the aircraft, and identify resource information that may be necessary to the scheduled maintenance. This identified information may then be used by logistic planner 914 to identify the tasks that may be needed to complete the mission of scheduled maintenance on the aircraft, for example.

Logistic planner 914 may use the data retrieved by mission scheduler 912 to identify and select a number of tasks for a mission. Data warehouse 918 may also receive data, such as data 920, from plurality of databases 906 or from an operator using operator interface-1 904. Data warehouse 918 may store data 920 for access by other components of mission planner-1 900, such as map/resource based planner 924, for example. Map/resource based planner 924 may use the information stored in data warehouse 918, as well as the selected number of tasks for the mission identified by logistic planner 914, to identify and allocate available robotic machine groups in the location where the mission is to be executed.

Multi-machine task simulation and planner 916 may analyze the information from logistic planner 914 and map/resource based planner 924 and may perform comprehensive simulations in order to prioritize tasks, combine tasks, analyze requests from an operator or number of operators, and/or identify a solution or number of solutions to the mission identified. In an illustrative example, multi-machine task simulation and planner 916 may analyze the number of tasks identified and selected for the mission by logistic planner 914 along with robotic machine groups identified in the location where the mission is to be executed by map/resource based planner 924 in order to simulate a number of solutions in which the number of tasks are executed by the robotic machine groups.

The number of solutions may then be sent by multi-machine task simulation and planner 916 as commands 930 to mission control 910, for example, in number of mission controls 908. The number of solutions may be sent to number of mission controls 908 for each robotic machine group identified in the solution or number of solutions. As used herein, number refers to one or more mission controls and/or one or more solutions. In an illustrative example, mission control 910 of number of mission controls 908 may be the mission control for the robotic machine group identified as being in the location where the mission is to be executed, and commands 930 may be sent to mission control 910.

Number of mission controls 908 may also send data 922 to mission planner-1 900. For example, mission control 910 may execute commands 930 and during execution may identify a conflict in the solution defined by commands 930. Mission control 910 may send data 922 back to mission planner-1 900 to identify this conflict to mission planner-1 900, for example. Data 922 from number of mission controls 908 may be received by situational awareness module 926 of mission planner-1 900.

Situational awareness module 926 may decode various requests or messages from number of mission controls 908 and send the decoded information to reflexive planner 928. The messages may include information about conflicts in the mission solution, for example. Reflexive planner 928 may modify the corresponding mission to accommodate the request or information from the messages. Reflexive planner 928 may react based on feedback from number of mission controls 908 during execution of a mission in order to modify the mission to adapt to current conditions.

Situational awareness module 926 may also decode command inputs from an operator using operator interface-1 904 that may be received during execution of a mission. In an illustrative example, an operator may oversee the execution of a mission and input commands to override a solution presented by mission planner-1 900, for example. In this illustrative example, the command inputs from the operator may be decoded by situational awareness module 926 and sent to reflexive planner 928 in order to modify the mission commands 930 sent to number of mission controls 908.

Multi-machine task simulation and planner 916 may evaluate all known conditions and factors in determining a number of solutions for meeting a mission objective based on the information received from logistic planner 914, map/resource based planner 924, and reflexive planner 928. Mission planner-1 900 may then coordinate mission plans based on information received from a number of external commands and real-time feedback.

Mission planner-1 900 may include dynamic replication process 931. Dynamic replication process 931 provides mission planner-1 900 with the capability of dynamic replication 933 for scenarios that may require multiple robotic machine groups. Mission planner-1 900 may be scalable and may duplicate itself using dynamic replication process 931 in order to manage multiple missions at the same time or a very complicated single mission that requires a large number of robotic machine groups. In an advantageous embodiment, mission planner-1 900 may undergo dynamic replication 933 to provide a number of mission planners for complex missions or scenarios, such as mission planner-2 932 and mission planner-3 934, for example. Although three mission planners are illustrated, any number of mission planners may be produced by dynamic replication process 931. As used herein, a number refers to one or more mission planners.

In an illustrative example for a multiple missions scenario case, each mission planner may be responsible for the corresponding single mission and manage robotic machine groups responsible for that mission. Each robotic machine group has its own mission control. For a very complicated single mission, the mission may be decomposed into a number of smaller tasks. Each mission planner may be responsible for a specific task and may assign subtasks to a given number of robotic machine groups, and more specifically to the mission control for each robotic machine group in the number of robotic machine groups.

In one advantageous embodiment, operator interface-1 904 may also be capable of dynamic replication in order to handle information flow between the mission planner(s) and operator interface(s). In this illustrative example, each mission planner, such as mission planner-1 900, mission planner-2 932, and mission planner-3 934 may have an individual operator interface, such as operator interface-1 904, operator interface-2 936, and operator interface-3 938. In another advantageous embodiment, a single operator interface, such as operator interface-1 904, may handle multiple mission planners, such as mission planner-1 900, mission planner-2 932, and mission planner-3 934.

Operator interface-1 904 may not need to replicate per the corresponding mission planner replications. Although many tasks may occur in a single mission planner, only necessary information or abstraction of the results from the mission planner may be sent to the operator interface and vice versa. A single operator interface may have the capacity to handle information coming from multiple mission planners, and then may not need to replicate. Otherwise, operator interface-1 904 may replicate accordingly, as needed to handle the information flow.

One illustrative example of a multiple mission scenario may be air robotic vehicles performing surveillance to secure a perimeter of an area while ground robotic vehicles perform a search and rescue mission in the area. The area may be, for example, without limitation, an urban environment. Mission planner-1 900 may manage the air robotic vehicle groups performing surveillance, while mission planner-2 932 may manage the ground robotic vehicle group performing the search and rescue mission, for example.

The ability of mission planner-1 900 to dynamically replicate for given complex missions or scenarios may provide efficiency and robustness. Managing complex missions or scenarios with multiple mission planners and operator interfaces may be more efficient than managing complex missions or scenarios with a single mission planner and operator interface. Additionally, an issue or anomaly with an individual mission planner or operator interface may not impact the entire mission due to the functional separation, or modularity, of multiple mission planners and/or operator interfaces, each of which may be easily replaceable.

The illustration of mission planner-1 900 in FIG. 9 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in mission planner-1 900.

Figure 10:
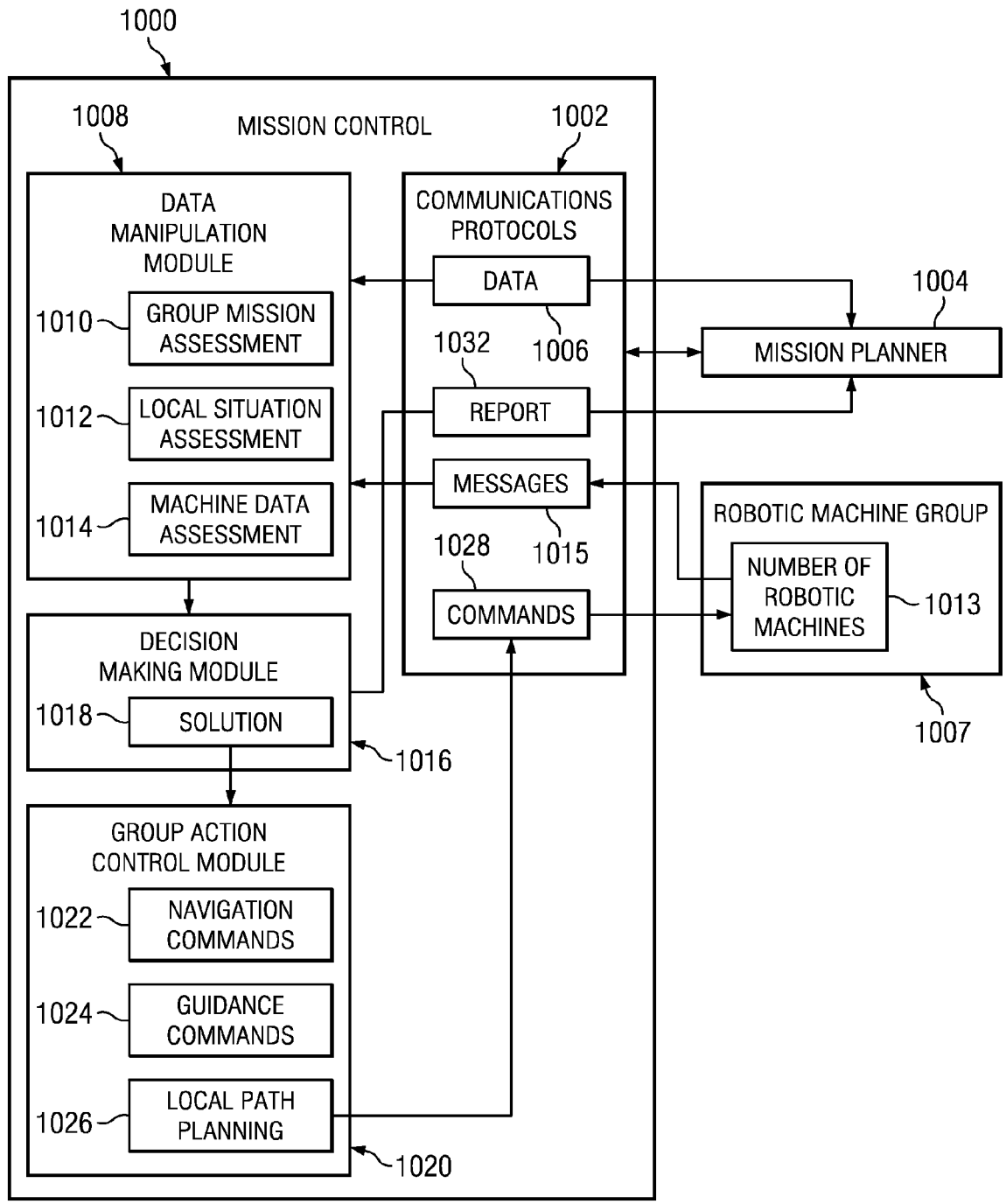
FIG. 10 is an illustration of a mission control in accordance with an advantageous embodiment.

With reference now to FIG. 10, an illustration of a mission control is depicted in accordance with an advantageous embodiment. Mission control 1000 may be an example of one implementation of mission control 330 in FIG. 3 or a mission control in number of mission controls 315, for example.

Mission control 1000 may include communications protocols 1002, which may query and receive data from other components of a mission planning system, such as mission planner 1004. Data 1006 may include commands, programs, and/or information. Data 1006 may be an example of information received from mission planner 1004, such as information including a mission objective and a number of tasks, for example. Mission planner 1004 may send data 1006 to mission control 1000 using communications protocols 1002. Data 1006 may be used by mission control 1000 to execute a mission using robotic machine group 1007.

Robotic machine group 1007 may be the robotic machine group controlled by mission control 1000. Each robotic machine group has its own mission control, such as number of robotic machine groups 312 and number of mission controls 315 in FIG. 3. Robotic machine group 1007 may include number of robotic machines 1013. Number of robotic machines 1013 may be an example of one implementation of number of robotic machines 505 of robotic machine group 502 in FIG. 5, for example.

Number of robotic machines 1013 may be capable of generating and sending messages 1015 during execution of a mission. Messages 1015 may contain information about the mission and/or number of robotic machines 1013 such as, for example, without limitation, the status of the mission, the status of number of robotic machines 1013, potential conflict in the mission, and/or any other suitable information.

Communications protocols 1002 may route information, such as data 1006 and messages 1015, to data manipulation module 1008. Data manipulation module 1008 may include, without limitation, group mission assessment 1010, local situation assessment 1012, and machine data assessment 1014. Group mission assessment 1010 may monitor the progress of a mission being executed by robotic machine group 1007. Local situation assessment 1012 may monitor the interactions between number of robotic machines 1013 within robotic machine group 1007.

In an illustrative example, interactions between number of robotic machines 1013 may be, without limitation, maintaining a relative distance minimum between each robotic machine in number of robotic machines 1013. Machine data assessment 1014 may monitor the status of each individual robotic machine within number of robotic machines 1013. Status may refer to, for example, without limitation, the availability, health, functionality, task progress, location, and/or other suitable status of an individual robotic machine.

Data manipulation module 1008 may process and store the information collected during the monitoring activities of group mission assessment 1010, local situation assessment 1012, and machine data assessment 1014. Data manipulation module 1008 may continuously monitor robotic machine group 1007 for conflicts, and may send any identified conflict to decision making module 1016. Decision making module 1016 may gather the information collected by data manipulation module 1008 and may determine whether the mission is executing without conflict or whether a conflict has developed during execution of the mission. If a conflict has developed during execution of the mission, decision making module 1016 may run a negotiation algorithm to identify and generate a local solution to the conflict, such as solution 1018. If decision making module 1016 is able to generate solution 1018, decision making module 1016 may send solution 1018 to group action control module 1020.

Group action control module 1020 may generate commands 1028 to send to number of robotic machines 1013 in robotic machine group 1007 based on solution 1018. Group action control module 1020 may include navigation commands 1022, guidance commands 1024, and local path planning 1026. For example, local situation assessment 1012 may identify one or more robotic machines in number of robotic machines 1013 that may not be maintaining minimum distance separation. Solution 1018 may include instructions used by group action control module 1020 for generating navigation commands 1022 to navigate one or more robotic machines to an appropriate distance separation, for example.

If decision making module 1016 is not able to identify a solution for the conflict identified, decision making module 1016 may generate report 1032 to send to mission planner 1004. Mission control 1000 may then wait for further commands and/or solutions from mission planner 1004 in order to update commands 1028 to robotic machine group 1007.

The illustration of mission control 1000 in FIG. 10 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in mission control 1000.

Figure 11:
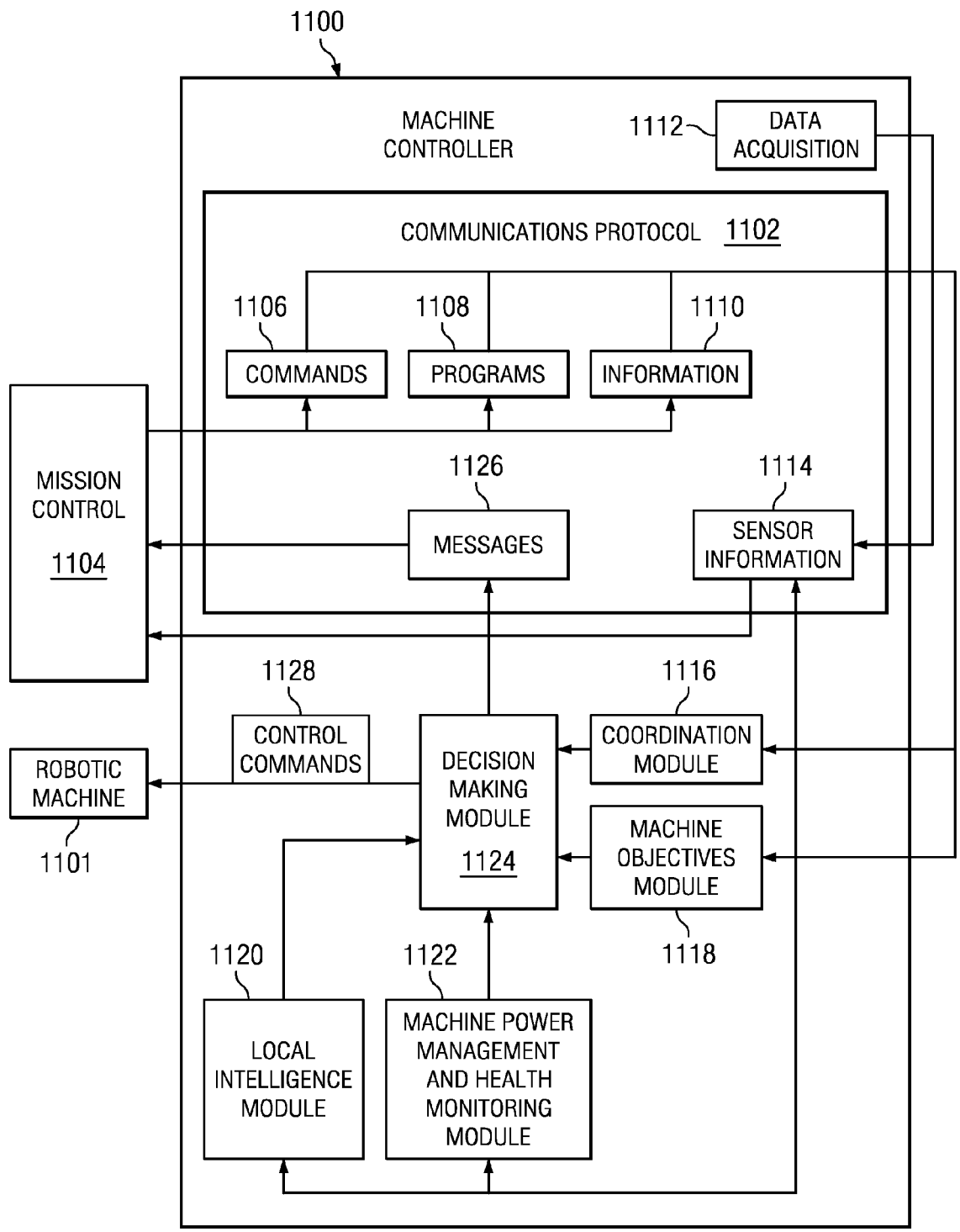
FIG. 11 is an illustration of a machine controller in accordance with an advantageous embodiment.

With reference now to FIG. 11, an illustration of a machine controller is depicted in accordance with an advantageous embodiment. Machine controller 1100 may be an example of one implementation of machine controller 532 in FIG. 5.

Machine controller 1100 may control robotic machine 1101. Machine controller 1100 may include communications protocol 1102. Communications protocol 1102 may handle incoming commands 1106, programs 1108, and information 1110 coming from mission control 1104. Communications protocol 1102 may also handle outgoing sensor information 1114 and messages 1126 being sent to mission control 1104. Data acquisition 1112 may receive sensor information from a sensor system on a robotic machine, such as sensor system 512 in FIG. 5, and send sensor information 1114 to mission control 1104 using communication2 protocol 1102. Sensor information 1114 may include, without limitation, information about an operating environment, structure, mission objective, resource, machine state, and/or other suitable sensor information.

Coordination module 1116 may decode group requirements for robotic machine 1101 sent from mission control 1104 using commands 1106, programs 1108, or information 1110. In an illustrative example, commands 1106 may be instructions to "inspect a wing" of an aircraft structure or "maintain a formation" with other robotic machines in the robotic machine group, for example. Machine objectives module 1118 may decode individual machine requirements for robotic machine 1101. In an illustrative example, individual requirements may be "follow this trajectory or waypoint" or "go from location A to location B".

Local intelligence module 1120 may detect information from other robotic machines nearby, such as other robotic machines in robotic machine group 1007 controlled by mission control 1000 in FIG. 10, for example. Information detected by local intelligence module 1120 may include, without limitation, the proximity of a number of robotic machines to robotic machine 1101, the direction in which a number of robotic machines are moving, and/or other suitable information. Local intelligence module 1120 may use sensor information 1114 to detect information from other robotic machines. For example, sensor information 1114 may include data from wireless camera 702, infrared camera 706, positioning system 712, and other sensor components of sensor system 700 in FIG. 7, which may be implemented on robotic machine 1101.

Machine power management and health monitoring module 1122 may manage the power and health status of robotic machine 1101. Power and health status may include, for example, without limitation, measuring and tracking available energy, such as battery state-of-charge. Machine power management and health monitoring module 1122 may provide information to decision making module 1124 on when a power source needs recharging or refueling, for example.

Machine power management and health monitoring module 1122 may manage health sensors of a sensory system on robotic machine 1101, such as sensor system 700 in FIG. 7, for example. Machine power management and health monitoring module 1122 may manage data and use data-driven or model-based prognostic and/or diagnostic algorithms to determine the health status of robotic machine 1101. Decision making module 1124 may receive information from each of coordination module 1116, machine objectives module 1118, local intelligence module 1120, and machine power management and health monitoring module 1122. Decision making module 1124 may use the information received to determine whether a given mission, sent by mission control 1104, may be achieved. Control commands 1128 may include path planning, guidance, and actuator control data.

Control commands 1128 may provide control of sensors of robotic machine 1101 such as, without limitation, turning a sensor on or off, controlling the orientation of a pan/tilt/zoom camera, or setting other sensor parameters, for example. If decision making module 1124 determines a mission can be achieved, decision making module 1124 may send control commands 1128 to robotic machine 1101 with the corresponding commands received from mission control 1104. If decision making module 1124 determines the mission is not achievable by robotic machine 1101, decision making module 1124 may send messages 1126 back to mission control 1104 indicating the conflict or issue with the mission sent by mission control 1104. Machine controller 1100 may then wait for new commands from mission control 1104 before sending any control commands to robotic machine 1101.

The illustration of machine controller 1100 in FIG. 11 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in machine controller 1100.

Figure 12:
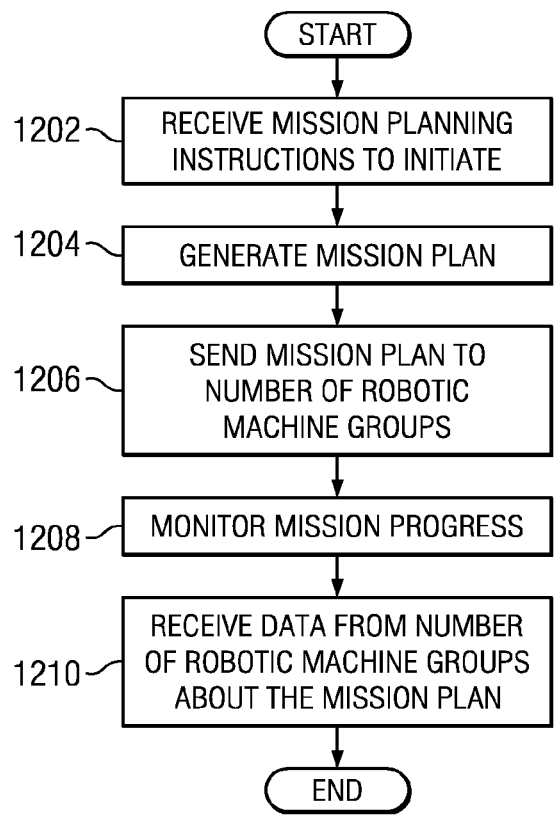
FIG. 12 is an illustration of a flowchart of a process for supervision and control of heterogeneous autonomous operations in accordance with an advantageous embodiment.

With reference now to FIG. 12, an illustration of a flowchart of a process for supervision and control of heterogeneous autonomous operations is depicted in accordance with an advantageous embodiment. The process in FIG. 12 may be implemented by a component, such as mission planner 310 in FIG. 3, for example.

The process may begin by receiving mission planning instructions to initiate (operation 1202). The mission planning instructions may be received by an operator, such as operator 302 using operator interface 308 and number of devices 309 in FIG. 3, for example. The mission planning instructions may also be received from a database in response to a schedule-driven or event-driven mission, such as plurality of databases 304 in FIG. 3.

The process uses the mission planning instructions to generate a mission plan (operation 1204). The mission plan, such as mission plan 311 in FIG. 3, may include a number of tasks, a mission objective, and other information necessary to allow a number of mission controls to execute the mission plan using a number of robotic machines, such as number of robotic machine groups 312 in FIG. 3, or number of robotic machines 505 in FIG. 5, for example. The process may then send the mission plan to a number of robotic machine groups (operation 1206), such as number of robotic machine groups 312 in FIG. 3.

The mission plan may be sent to the mission control for each robotic machine group that is identified in the mission plan such as, for example, without limitation, number of mission controls 315 in FIG. 3. The process may then monitor the mission progress (operation 1208). The progress may be monitored using information received from the number of robotic machine groups and, more specifically, from the number of mission controls of the number of robotic machine groups, such as number of mission controls 315 of number of robotic machine groups 312 in FIG. 3.

The process may receive data from the number of robotic machine groups about the mission plan (operation 1210), with the process terminating thereafter. The data received may include messages, such as messages 322 in FIG. 3, from the robotic machine groups about a conflict or issue that has developed during execution of the mission, for example. The data may also include messages about the progress of a mission, the completion of a mission, and/or other suitable information.

Figure 13:
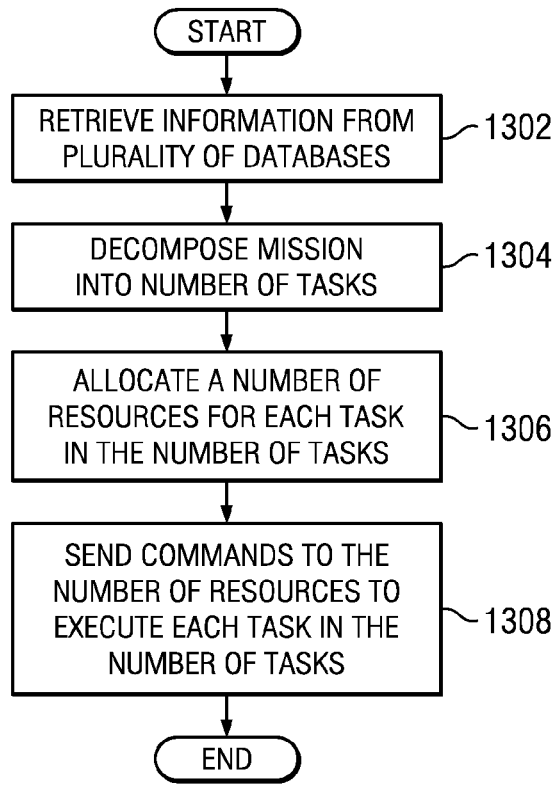
FIG. 13 is an illustration of a flowchart of a process for generating a mission plan in accordance with an advantageous embodiment.

With reference now to FIG. 13, an illustration of a flowchart of a process for generating a mission plan is depicted in accordance with an advantageous embodiment. The process in FIG. 13 may be implemented by a component, such as mission planner 310 in FIG. 3, for example.

The process may begin by retrieving information from a plurality of databases (operation 1302), such as plurality of databases 304 in FIG. 3, for example. The information retrieved may include, for example, without limitation, mission schedules, mission histories, and resource information. The information retrieved may be used by mission scheduler 912 in FIG. 9 to identify scheduled missions, mission history, and resource information that may be necessary to generate a mission plan. Logistic planner 914 in FIG. 9 may use the information retrieved in operation 1302 to identify a number of tasks that may be needed to complete a mission plan, for example. The process may then decompose a mission into a number of tasks (operation 1304).

Next, the process may allocate a number of resources for each task in the number of tasks (operation 1306). Map/Resource based planner 924 in FIG. 9 may use the number of tasks identified by logistic planner 914 to identify and allocate available resources, such as robotic machine groups, for example, in the location where the mission plan is to be executed. Map/Resource based planner 924 in FIG. 9 may also use information retrieved in operation 1302 and stored in data warehouse 918 to identify and allocate available resources.

The process may then send commands to the number of resources to execute each task in the number of tasks (operation 1308), with the process terminating thereafter. The number of resources may be, without limitation, number of robotic machine groups 312 in FIG. 3, for example.

Figure 14:
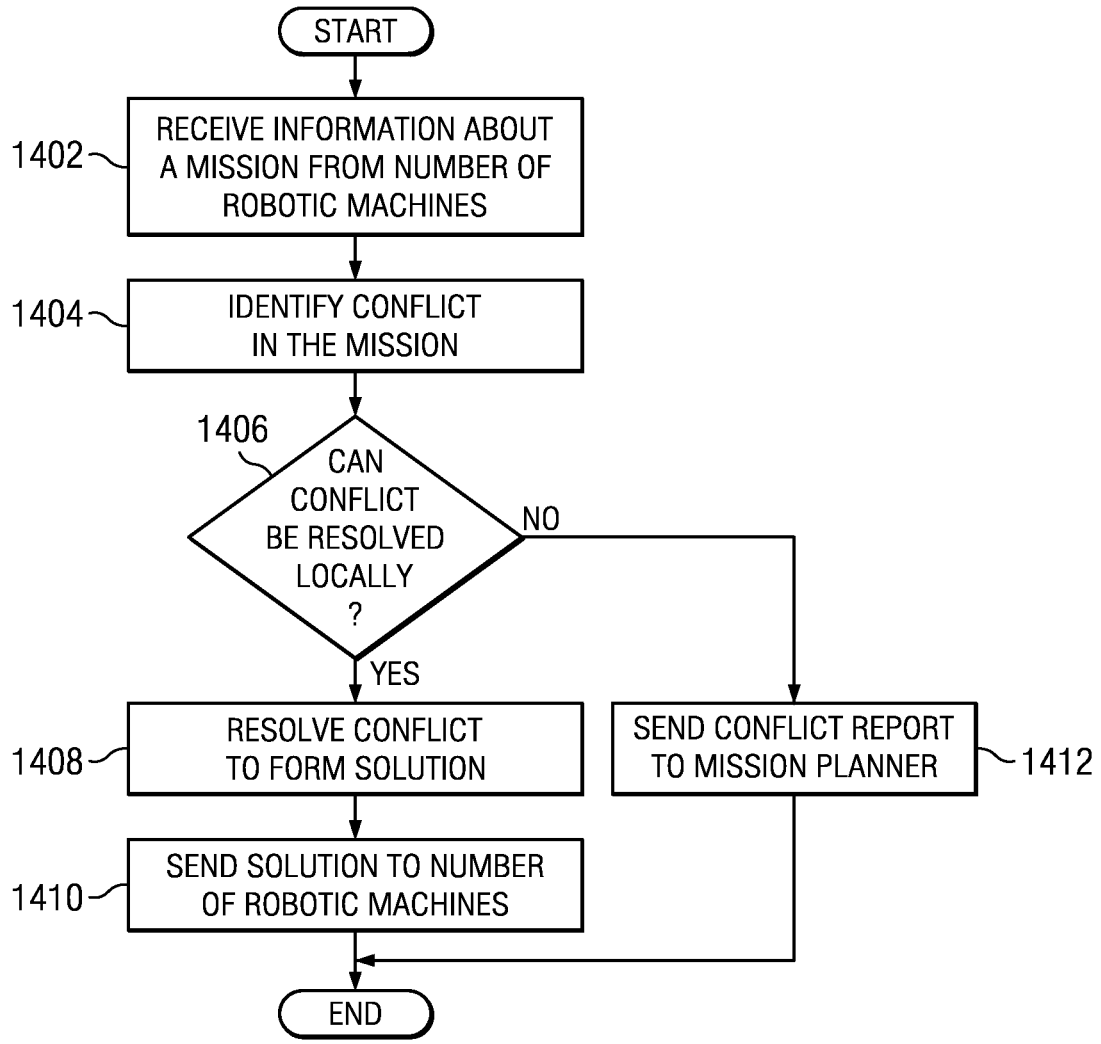
FIG. 14 is an illustration of a flowchart of a process for resolving mission plan conflicts in accordance with an advantageous embodiment.

With reference now to FIG. 14, an illustration of a flowchart of a process for resolving mission plan conflicts is depicted in accordance with an advantageous embodiment. The process in FIG. 14 may be implemented by a component, such as mission control 1000 in FIG. 10, for example.

The process may begin by receiving information about a mission from a number of robotic machines (operation 1402). The mission may be mission plan 311 in FIG. 3 that robotic machine group 1 324 has been tasked to execute, for example. The process may identify a conflict in the mission (operation 1404) being executed by the number of robotic machines. In one illustrative example, a conflict in the mission may be an unplanned functional degradation such as, but not limited to, sensing and/or mobility of a number of robotic machines, which may result in a conflict in being able to meet a desired mission "time to complete" performance metric.

The process may then determine whether the conflict can be resolved locally (operation 1406). Local resolution may refer to the ability of a mission control for a robotic machine group, such as mission control 330 for robotic machine group 1 324, to resolve the conflict and send a solution to the number of robotic machines. If the process can be resolved locally, the process may resolve the conflict to form a solution (operation 1408). The process may then send the solution to the number of robotic machines (operation 1410), with the process terminating thereafter.

Resolving a conflict may involve generating a solution that may be sent to the number of robotic machines in the form of new commands or programs, for example. In an advantageous embodiment, if the level of charge of a battery in a robotic device is insufficient to provide sensor power levels necessary to perform an inspection task at a speed required to complete the overall inspection within a specified end time, the affected robotic device may resolve the conflict by performing the inspection task at a slower speed while sending commands to the other robotic devices to perform inspection tasks at a higher speed to ensure the overall inspection is completed within the end-time constraint.

Referring back to operation 1406, if the process cannot be resolved locally by mission control, the process may then send a conflict report to the mission planner (operation 1412), with the process terminating thereafter. The mission planner may then resolve the conflict, if possible, and send modified mission plan 332 in FIG. 3, for example, to the number of robotic machines. In an advantageous embodiment, if the level of charge of a battery in a robotic device is insufficient to perform an inspection task, the mission planner may resolve the conflict by assigning a robotic device that has a fully charged battery.

If the mission planner is unable to resolve the conflict, an alert or message may be sent to an operator, such as operator 302 using operator interface 308 and number of devices 309 in FIG. 3, for example. In an advantageous embodiment, if the level of charge of a battery in a robotic device is insufficient to perform an inspection task and there are no other robotic devices available for assignment, the mission planner may alert the operator.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize that currently used mission planning systems do not provide continuous and/or periodic data needed to detect and monitor current conditions during execution of a mission. The different advantageous embodiments also recognize that existing mission planning methods focus on a single system that may populate the same solution for a specific task or operation.

The different advantageous embodiments take into account and recognize that currently used planning systems are not robust for dynamically planning and coordinating multiple remote robotic machine groups, each of which may be intermittently dispatched and recalled during a given high-level mission. In addition, significant operator workload is required to maintain operations of such complex coupled systems of systems due to functional failure or other unexpected environmental or mission operating conditions.

Thus, one or more of the different advantageous embodiments may provide an apparatus that may include a number of robotic machine groups, a mission planner, and a mission control. The mission planner may be capable of generating a mission for the number of robotic machine groups. The mission control may be capable of executing the mission using the number of robotic machine groups.

The different advantageous embodiments may further provide a method for mission management. A mission plan may be generated. The mission plan may be sent to a number of robotic machine groups. The progress of the mission plan by the number of robotic machine groups may be monitored. Data may be received from the number of robotic machine groups about the mission plan.

The different advantageous embodiments may further provide a method for mission management. Information about a mission may be received from a number of robotic machines. A conflict in the mission may be identified. A determination may be made as to whether the conflict can be resolved.

The different advantageous embodiments may still further provide an apparatus that may include a number of robotic machine groups, a mission planner, a mission control, a wireless communications system, a logistic planner, and a reflexive planner. The mission planner may be capable of generating a mission for the number of robotic machine groups. The mission control may be capable of executing the mission using the number of robotic machine groups. The wireless communications system may be capable of providing communications with the number of robotic machine groups, the mission control, and the mission planner. The logistic planner may be capable of identifying a number of tasks to execute the mission. The reflexive planner may be capable of modifying the mission in response to a number of messages from the number of robotic machine groups.

The different advantageous embodiments may still further provide a method for generating a mission plan for a mission. Information may be retrieved from a plurality of databases. The information retrieved may include at least one of mission schedules, mission histories, and resource information. The mission plan may be decomposed into a number of tasks. A number of resources may be allocated for the number of tasks in the mission plan. The mission plan may be sent to a number of robotic machine groups. The mission plan may include the number of tasks for the mission. Progress of the mission plan may be monitored by the number of robotic machine groups. Data may be received from the number of robotic machine groups about the mission plan.

The different advantageous embodiments may provide a scalable, flexible mission planning system that is robust to planning and controlling multiple heterogeneous robotic machine groups subjected to dynamic operating conditions with time-varying mission objectives.

The different advantageous embodiments may further provide an autonomous system of systems that may accomplish a number of different missions. The different advantageous embodiments may provide for continuous, autonomous mission planning and execution. The different advantageous embodiments may provide for a system that incorporates both mobile and fixed robotic units to provide for continuous, autonomous mission planning and execution. The different advantageous embodiments may minimize the cost of designing a mission and modifying a mission to adapt to current conditions. The different advantageous embodiments may enable efficient verification of automated decision control, coordination, and task scheduling functions for a group of collaborating heterogeneous robotic machines.

The different advantageous embodiments can take the form of an entirely hardware embodiment, an entirely software embodiment, or an embodiment containing both hardware and software elements. Some embodiments are implemented in software, which includes, but is not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters, and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a plurality of robotic vehicles;
   a mission planner configured to generate a mission for the plurality of robotic vehicles, decomposing the mission into a plurality of tasks, and allocating at least one task of the plurality of tasks to one robotic vehicle group, wherein the mission comprises at least one of maintenance of an aircraft, service of the aircraft, component manufacturing of the aircraft, and subassembly manufacturing of the aircraft;
   a plurality of mission controls configured to receive the mission from the mission planner and to execute the mission using the plurality of robotic vehicles, acting in concert;
   an operator interface comprising an adaptive decision making module configured to determine whether a decision to be made by the adaptive decision making module with respect to the mission is critical or non-critical, wherein for a critical decision the decision must be made by an operator and for a non-critical decision the decision may be made by the adaptive decision making module or by the operator; and a wireless communications system configured to provide communications among the plurality of robotic vehicles, the mission planner, the operator interface, and the mission control, wherein each of the robotic vehicles is in communication with each other, the mission planner, and the mission control, and each robotic vehicle in the plurality of robotic vehicles has an individual mission control from the plurality of mission controls, the individual mission control being configured to receive information about the mission from the robotic vehicles, identify a conflict in the mission; and determine whether the individual mission control can resolve the conflict;

wherein the individual mission control is further configured to either resolve the conflict to form a solution and send the solution to the robotic vehicle in response to the determination that the individual mission control can resolve the conflict, or send a conflict report to the mission planner in response to the determination that the individual mission control cannot resolve the conflict.

2. The system of claim 1, wherein the mission planner is further configured to perform a dynamic replication process.

3. The system of claim 2 wherein the dynamic replication process duplicates the mission planner.

4. The system of claim 2, wherein the mission planner is scalable and configured to duplicate itself using the replication process, wherein the mission planner further comprises a logistic planner configured to identify a plurality of tasks to execute the mission and a reflexive planner configured to modify the mission in response to a plurality of messages from the plurality of robotic vehicles.

5. The system of claim 1 further comprising:
a display device in communication with the operator interface, the display device configured to display information in order of importance to enable the operator to understand a situation and take action or make an informed decision.

6. The system of claim 1, wherein the adaptive decision making module is configured to determine criticality of the decision based on information from a database, and wherein the database contains at least one of a table of non-critical decisions and a rule-based system for deciding whether the decision is critical.

7. An apparatus comprising:
a plurality of robotic machine groups;
a mission planner configured to generate a mission for the plurality of robotic machine groups, and to decompose the mission into a plurality of tasks, and allocate at least one task of the plurality of tasks to one robotic vehicle group in the plurality of robotic machine groups, wherein the mission comprises at least one of maintenance of an aircraft, service of the aircraft, component manufacturing of the aircraft, and subassembly manufacturing of the aircraft;
a plurality of mission controls configured to execute the mission using the plurality of robotic machine groups;
an operator interface comprising an adaptive decision making module configured to determine whether a decision to be made by the adaptive decision making module with respect to the mission is critical or non-critical, wherein for a critical decision the decision must be made by an operator and for a non-critical decision the decision may be made by the adaptive decision making module or by the operator; and
a wireless communications system configured to provide communications with the plurality of robotic machine groups, the mission control, the operator interface, and the mission planner, wherein each robotic machine in the plurality of robotic machine groups is in communication with other robotic machines in a particular group, and each robotic vehicle in the plurality of robotic machine groups has an individual mission control from the plurality number of mission controls, the individual mission control being configured to receive information about the mission from the robotic vehicles, identify a conflict in the mission; and determine whether the individual mission control can resolve the conflict, wherein the individual mission control is further configured to either resolve the conflict to form a solution and send the solution to the robotic vehicle in response to the determination that the individual mission control can resolve the conflict, or send a conflict report to the mission planner in response to the determination that the individual mission control cannot resolve the conflict.

8. The apparatus of claim 7, wherein the mission planner further comprises a logistic planner configured to identify a number of tasks to execute the mission.

9. The apparatus of claim 7, wherein the mission planner further comprises:
a reflexive planner configured to modify the mission in response to a number of messages from the plurality of robotic machine groups.

10. The apparatus of claim 7, wherein the plurality of robotic machine groups comprises a heterogeneous plurality of robotic machine groups.

11. The apparatus of claim 7 further comprising:
a number of programs configured to run on the plurality of machine groups, wherein the number of programs comprises at least one of a numerical control program, a neural network, fuzzy logic, and artificial intelligence.

12. A method for mission management, the method comprising:
generating a mission plan for a mission comprising at least one of maintenance of an aircraft, service of the aircraft, component manufacturing of the aircraft, and subassembly manufacturing of the aircraft, wherein the mission plan is for a plurality of robotic vehicles groups;
decomposing the mission plan into a plurality of tasks, and allocating at least one task of the plurality of tasks to one robotic vehicle group of the plurality of robotic vehicle groups;
using a wireless communications system to provide communications with the plurality of robotic machine groups comprising groups of robotic vehicles, one of a plurality of mission controls, and a mission planner, wherein each robotic vehicle in a given group of robotic vehicles is in communication with each other;
sending the mission plan to the plurality of robotic machine groups, including sending the at least one task to the one robotic vehicle group and wherein each robotic vehicle in the plurality of robotic vehicle groups has an individual mission control from the plurality of mission controls, the individual mission control being configured to receive information about the mission from the robotic vehicles, identify a conflict in the mission; and determine whether the individual mission control can resolve the conflict;
monitoring progress of the mission plan by the plurality of robotic machine groups;
receiving data from the plurality of robotic machine groups about the mission plan;
determining, by an adaptive decision making module in communication with the wireless communication system, whether a decision with respect to the mission plan is critical or non-critical, wherein for a critical decision the decision must be made by an operator and for a non-critical decision the decision may be made by the adaptive decision making module or by the operator; and either resolving the conflict to form a solution and sending the solution to a given robotic vehicle in response to the determination that the individual mission control can resolve the conflict, or sending a conflict report to the mission planner in response to the determination that the individual mission control cannot resolve the conflict.

13. The method of claim 12, wherein generating the mission plan further comprises:

retrieving information from a plurality of databases, wherein the information retrieved includes at least one of mission schedules, mission histories, and resource information.

14. The method of claim 12, wherein generating the mission plan further comprises:

decomposing the mission plan into a number of tasks; and allocating a number of resources for the number of tasks.

15. The method of claim 12, wherein sending the mission plan to the plurality of robotic machine groups further comprises:

sending commands to the plurality of robotic machine groups to execute a number of tasks.

16. An apparatus comprising:

a plurality of robotic machine groups comprising groups of robotic vehicles;

a mission planner configured to generate a mission for the plurality of robotic machine groups, and to decompose the mission into a plurality of tasks, and allocate at least one task of the plurality of tasks to one robotic vehicle group of the plurality of robotic machine groups, wherein the mission comprises at least one of maintenance of an aircraft, service of the aircraft, component manufacturing of the aircraft, and subassembly manufacturing of the aircraft, and wherein the mission planner is further configured to perform a dynamic replication process;

a plurality of mission controls configured to execute mission using the plurality of robotic machine groups;

a wireless communications system configured to provide communications with the plurality of robotic machine groups, the mission control, and the mission planner, and each robotic vehicle in the plurality of robotic vehicle groups has an individual mission control from the plurality number of mission controls, the individual mission control being configured to receive information about the mission from the robotic vehicles, identify a conflict in the mission, and determine whether the individual mission control can resolve the conflict;

wherein the individual mission control is further configured to either resolve the conflict to form a solution and send the solution to the robotic vehicle in response to the determination that the individual mission control can resolve the conflict, or send a conflict report to the mission planner in response to the determination that the individual mission control cannot resolve the conflict;

a logistic planner configured to identify a number of tasks to execute the mission;

a reflexive planner configured to modify the mission in response to a number of messages from the plurality of robotic machine groups; and an operator interface comprising an adaptive decision making module configured to determine whether a decision to be made by the adaptive decision making module with respect to the mission is critical or non-critical, wherein for a critical decision the decision must be made by an operator and for a non-critical decision the decision may be made by the adaptive decision making module or by the operator.

17. The apparatus of claim 16, wherein the dynamic replication process duplicates the mission planner.

18. A method for mission management, the method comprising:

generating a mission plan for a mission, wherein the mission comprises at least one of maintenance of an aircraft, service of the aircraft, component manufacturing of the aircraft, and subassembly manufacturing of the aircraft, wherein the mission plan is for a plurality of robotic vehicles groups;

decomposing the mission plan into a plurality of tasks, and allocating at least one task of the plurality of tasks to one robotic vehicle group of the plurality of robotic vehicle groups;

retrieving information from a plurality of databases using a wireless communications system;

allocating a plurality of resources for the plurality of tasks in the mission plan;

sending the mission plan to a plurality of robotic machine groups using the wireless communications system, wherein the plurality of robotic machines groups comprise groups of robotic vehicles, and wherein each robotic vehicle in a given group of robotic vehicles is in communication with each other, including sending the at least one task to the one robotic vehicle group and wherein each robotic vehicle in the plurality of robotic vehicle groups has an individual mission control from the plurality of mission controls, the individual mission control being configured to receive information about the mission from the robotic vehicles, identify a conflict in the mission; and determine whether the individual mission control can resolve the conflict;

monitoring progress of the mission plan by the plurality of robotic machine groups using the wireless communications system;

receiving data from the plurality of robotic machine groups about the mission plan, using the wireless communications system; and determining, by an adaptive decision making module in communication with the wireless communication system, whether a decision with respect to the mission plan is critical or non-critical, wherein for a critical decision the decision must be made by an operator and for a non-critical decision the decision may be made by the adaptive decision making module or by the operator; and either resolving the conflict to form a solution and sending the solution to a given robotic vehicle in response to the determination that the individual mission control can resolve the conflict, or sending a conflict report to the mission planner in response to the determination that the individual mission control cannot resolve the conflict.

19. The method of claim 18, wherein the information retrieved includes at least one of mission schedules, mission histories, and resource information.

* * * * *